(12) United States Patent
Mathieu

(10) Patent No.: US 10,430,644 B2
(45) Date of Patent: Oct. 1, 2019

(54) BLENDED IRIS AND FACIAL BIOMETRIC SYSTEM

(71) Applicant: Global Bionic Optics, Ltd., Taree, NSW (AU)

(72) Inventor: Gilles Mathieu, Peng Chau (HK)

(73) Assignee: Global Bionic Optics Ltd., Taree (AU)

( * ) Notice: Subject to any disclaimer, the term of this patent is extended or adjusted under 35 U.S.C. 154(b) by 9 days.

(21) Appl. No.: 15/615,746

(22) Filed: Jun. 6, 2017

(65) Prior Publication Data

US 2018/0349683 A1 Dec. 6, 2018

(51) Int. Cl.
G06K 9/00 (2006.01)
G06K 9/20 (2006.01)

(52) U.S. Cl.
CPC ..... *G06K 9/00288* (2013.01); *G06K 9/00255* (2013.01); *G06K 9/00604* (2013.01); *G06K 9/00617* (2013.01); *G06K 9/00892* (2013.01); *G06K 9/2027* (2013.01)

(58) Field of Classification Search
CPC .......... G06K 9/00288; G06K 9/00255; G06K 9/00604; G06K 9/00617
See application file for complete search history.

(56) References Cited

U.S. PATENT DOCUMENTS

| | | | |
|---|---|---|---|
| 7,058,209 B2 | 6/2006 | Chen et al. | |
| 7,239,726 B2 | 7/2007 | Li | |
| 7,602,947 B1 | 10/2009 | Lemelson et al. | |
| 7,697,735 B2 | 4/2010 | Adam et al. | |
| 8,433,103 B2 | 4/2013 | Friedman et al. | |
| 8,488,044 B2 | 7/2013 | Mathieu et al. | |
| 8,558,663 B2 | 10/2013 | Newman et al. | |
| 8,705,808 B2 | 4/2014 | Determan et al. | |
| 9,373,023 B2 | 6/2016 | Stoker | |
| 9,613,281 B2 | 4/2017 | Hanna et al. | |
| 9,626,549 B1 | 4/2017 | Chen et al. | |
| 2005/0238210 A1 | 10/2005 | Sim | |
| 2010/0110275 A1* | 5/2010 | Mathieu | A61B 5/1171 348/360 |
| 2010/0128937 A1 | 5/2010 | Yoo et al. | |
| 2015/0371081 A1 | 12/2015 | Luan | |
| 2016/0117544 A1* | 4/2016 | Hoyos | H04N 5/23219 348/78 |
| 2016/0180147 A1 | 6/2016 | Mazumdar et al. | |
| 2016/0335495 A1 | 11/2016 | Kim et al. | |
| 2017/0193284 A1* | 7/2017 | Yoon | G06K 9/00248 |

OTHER PUBLICATIONS

International Search Report and Written Opinion in Application No. PCT/US2018/000584, dated Oct. 2, 2018 (17 pages).

* cited by examiner

*Primary Examiner* — Ruiping Li
(74) *Attorney, Agent, or Firm* — Haley Guiliano LLP

(57) ABSTRACT

An optical system is able to capture images of at least a portion of a candidate's face within a near field, a medium field, and a far field. For images captured within the near field, data representing the candidate's iris may be captured from the image and compared to know iris data. For images captured within the medium field, data representing the candidate's iris and facial featured may be captured from the image and compared to know iris data and facial data. For images captured within the far field, data representing the candidate's facial features may be captured from the image and compared to know facial data.

22 Claims, 18 Drawing Sheets

BLENDED IRIS AND FACIAL BIOMETRIC SYSTEM

FIELD OF THE INVENTION

The subject disclosure is directed to a biometric identification system having an extended depth-of-field optical system for biometric identification using iris and facial techniques.

BACKGROUND OF THE INVENTION

Biometric systems such as iris and facial recognition systems may capture an image of a feature of a person having unique characteristics (e.g., an iris or facial features) for various purposes, for example, to confirm the identity of the person based on the captured image. In the example of iris recognition, an original high-quality image of the iris of a person may be captured by an optical system and converted into an iris code which is stored in a database of iris codes associated with a group of people. Similarly, a facial recognition system may capture certain facial features. These features are extracted from various processing methods and compared to similar records of facial features stored in a database. These stored records may be user files that are associated with a respective user and may later be used for comparison to captured images.

In order to later confirm the identity of a user, an image of the user's iris or face is captured, the respective comparison file is generated (e.g., iris codes or facial codes), and the comparison data for the captured biometric features is compared to the user data. If the comparison file exhibits a significant level of similarity with a stored iris code (e.g., the Hamming distance between the captured and stored image is less than a threshold), it can be assumed that the feature being compared (e.g., iris or facial features) of the user is a match with the identity associated with the stored user file.

Iris and facial recognition systems may each perform differently depending upon the characteristics of an optical system that is acquiring the iris or facial images. In general, an iris recognition system may operate in a range that is relatively close to a user, having focal point in a range of a few centimeters to less than meter from the lens. Because of the resolution required to acquire a useful iris image, the depth of field for conventional systems may be minimal, e.g., only a few centimeters. Conventional iris recognitions systems thus require a user to be stationary at a certain distance from the lens system, which is difficult and time consuming in modern applications such as cell phones, laptop computers, or access systems. Some systems employ complex combinations of lenses, sensors, focus, and illumination systems to capture useful iris images for subjects who are not stationary. However, such systems are complicated, expensive, and bulky. Facial recognition generally operates within a range that is further from the lens in order to capture the combination of facial features that is necessary for facial recognition. Facial recognition is less accurate than iris recognition, and in ranges where fewer facial features are captured this accuracy is further compromised.

SUMMARY OF THE INVENTION

In an exemplary embodiment of the present disclosure, a method for identifying a candidate may comprise capturing, by an optical system, one or more raw images of the candidate, identifying, by the optical system, an iris portion and a facial portion within each of the one or more raw images, and quantifying, by the optical system, each of the iris portion and the facial portion. The method may also comprise comparing, by the optical system, the quantified iris portion with iris enrollment data and the quantified facial portion with facial enrollment data, and confirming, by the optical system, an identify of the candidate based on the comparing.

In an exemplary embodiment of the present disclosure, an optical system may comprise at least one lens configured to capture one or more raw images of a candidate and a controller coupled to the optical system. The controller may be configured to identify an iris portion and a facial portion within each of the one or more raw images, quantifying each of the iris portion and the facial portion, compare the quantified iris portion with iris enrollment data and the quantified facial portion with facial enrollment data, and confirm an identify of the candidate based on the comparing.

In an exemplary embodiment of the present disclosure, a method for identifying a candidate may comprise determining, by an optical system, whether the candidate is located within a near field, a medium field, or a far field and capturing, by the optical system, one or more raw images of a face of the candidate. The method may further comprise quantifying, by the optical system, only an iris portion of the face when the candidate is located in the near field, quantifying, by the optical system, the iris portion of the face and a facial portion of the face when the candidate is located in the medium field, and quantifying, by the optical system, only the facial portion of the face when the candidate is located in the far field. The method may further comprise comparing, by the optical system when the candidate is in the near field or the medium field, the quantified iris portion with iris enrollment data, comparing, by the optical system when the candidate is in the medium field or the far field, the quantified facial portion with facial enrollment data, and confirming, by the optical system, an identify of the candidate based on the comparing.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION OF ILLUSTRATIVE EMBODIMENTS

Figure 1:
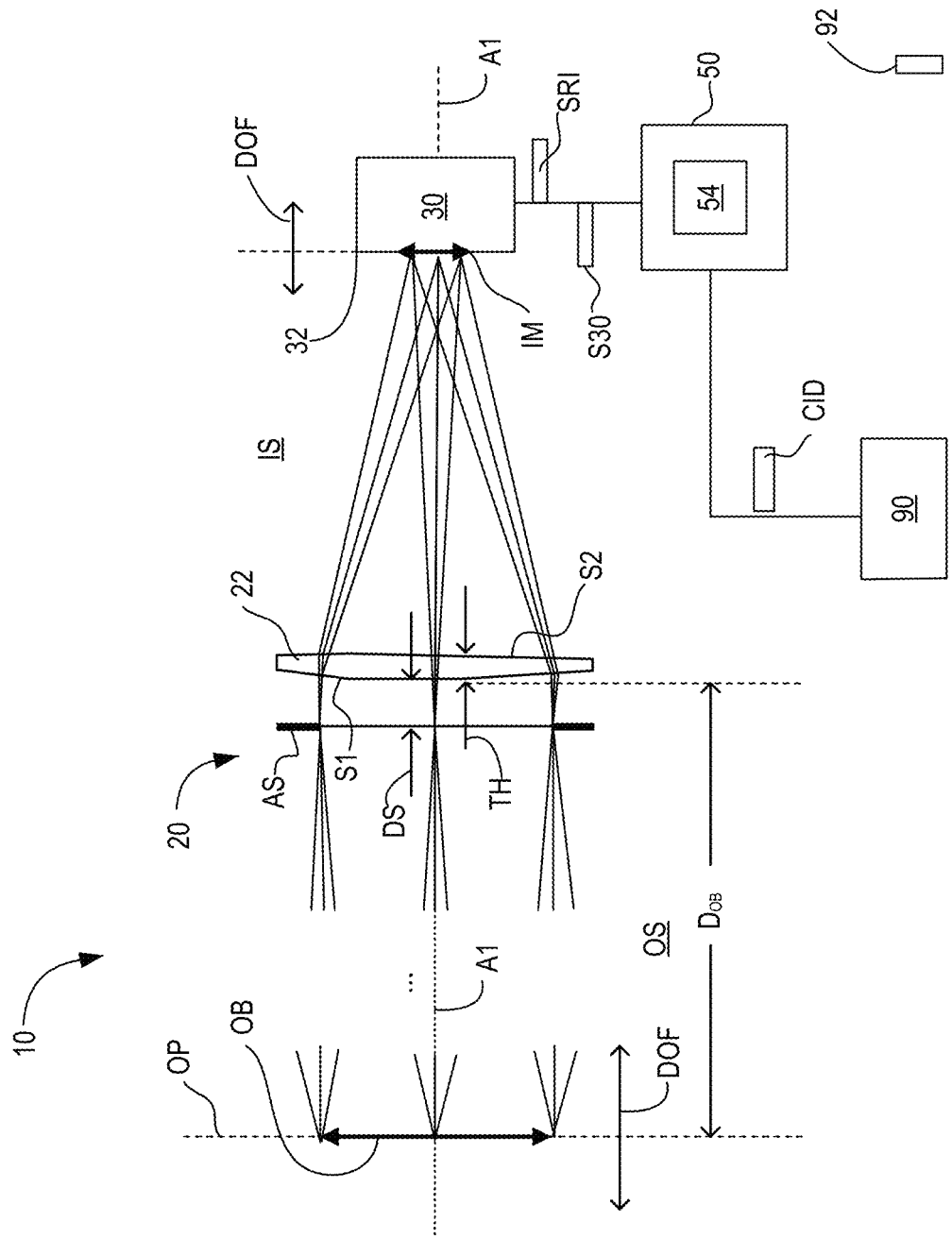
FIG. 1 depicts an exemplary system diagram of a system for image acquisition, processing, and identification in accordance with some embodiments of the present disclosure.

Exemplary biometric systems such as iris and facial recognitions systems are described herein for the purposes of illustration and not limitation. For example, one skilled in the art can appreciate that the illustrative embodiments can have application with respect to other biometric systems and to other recognition applications such as industrial automation systems.

Reference is now made in detail to the present exemplary embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the exemplary embodiments may be omitted, modified, or combined in different ways to achieve yet further embodiments. Accordingly, the true scope of the invention is to be understood from the entirety of the present disclosure, in view of but not limited to the embodiments described herein.

Embodiments of the present disclosure describe systems and methods of acquiring iris and facial images with an optical system, such as an extended depth-of-field (EDOF) system, and in some embodiments, a EDOF system implemented with a single lens EDOF for both iris and facial capture.

The images may be processed based on the type of images that are captured. In an exemplary embodiment, and based on an optical system used to capture the images, a first region that is relatively close to the optical system may be suitable for capturing iris images with an accuracy such that a high confidence level (e.g., >99%) exists that that iris images are usable for iris recognition. In the present disclosure, this region may be referred to as a "near field." A second region that is relatively far from the optical system may be suitable for capturing facial images with an accuracy such that a high confidence level (e.g., >99%) exists that that facial images are usable for facial recognition. In the present disclosure, this region may be referred to as a "far field." With a suitable optical system, a third region may encompass a distance that is between the near field and the far field within which it is possible to capture both iris images and facial images. One or both of the iris images and/or the facial images may not yield an accuracy that is individually within the desired confidence level (e.g., >99%), however, by utilizing a combined facial and iris recognition technique the overall confidence level may fall within an acceptable level (e.g., >99%). In the present disclosure, this region may be referred to as a "medium field."

In some embodiments, the subject may be moving such that images are captured within a plurality of the far field, medium field, and the near field. In such instances, techniques may be utilized that combine a far field analysis and medium field analysis, medium field analysis and near field analysis, and all three of far field, medium field, and near field. In some embodiments, if a subject temporarily exits the field of view of the optical system between different regions, the identity of the subject may be confirmed based on images captured within different regions (e.g., confirming a lower-probability facial recognition based on a higher-probability iris or blended recognition).

A variety of optical systems may be utilized in accordance with the present disclosure, including systems with multiple optical systems, multiple optical elements within one or more optical systems, secondary sensors for identifying a user's location, and complex focus systems. In an exemplary embodiment, an EDOF optical system may be utilized. The EDOF optical system may successfully capture images within all of the near field, medium field, and far field, and without requiring multiple optical systems or any auto-focus system. In some embodiments, the EDOF optical system may be implemented with a single lens having a spherical aberration such that the depth of field or the depth of focus increases by an amount between 20% and 500% as compared to a diffraction limited optical system, which may facilitate the acquisition of images in each of the near field, middle field, and far field.

The systems and methods described herein may be implemented by any suitable hardware and/or software implementation for use in any suitable device that can capture and process images, such as security systems, tablet computers, cell phones, smart phones, computers, cameras, mobile iris recognition devices, restricted-entry devices, CCTV systems, appliances, vehicles, weapons systems, any other suitable device, or any combination thereof. Moreover, it will be understood that an EDOF system and biometric comparison system may be used for other biometric applications as well as other capture and recognition systems, for example, in industrial applications.

A generalized single-lens EDOF optical system is first discussed, followed by exemplary embodiments of single-lens imaging optical systems for use in the generalized EDOF optical system. This disclosure will then address a blended iris and facial recognition system.

Generalized EDOF System

FIG. 1 is a block diagram of an exemplary embodiment of a single-lens EDOF optical system ("system") 10 in accordance with the present disclosure. System 10 includes an optical axis A1 along which is arranged an imaging optical system 20 that consists of a single lens element 22 and an aperture stop AS located objectwise of the lens element at an axial distance DS from an objectwise front lens surface SI. Aperture stop AS is "clear" or "open," meaning that it does not include any phase-altering elements, such as phase plates, phase-encoding optical elements or other types of phase-altering means. Although any suitable single-lens optical system may be used in accordance with the present disclosure, in an embodiment, the single-lens optical system may be configured as is described in U.S. Pat. No. 8,594,388, which is incorporated herein by reference in its entirety. In another exemplary embodiment (not depicted), the single-lens optical system may include a thick single lens as depicted and described in U.S. Pat. No. 8,416,334, which is incorporated herein by reference in its entirety.

Returning to FIG. 1, such a single-lens optical system may include an aperture stop that is located at a position that minimizes comatic aberration, and may be constructed of any suitable materials, such as glass or plastic. In some embodiments, the single lens may be a single, rotationally symmetric optical component made of a single optical material, for example, as is described in U.S. Pat. No. 8,416,334, which is incorporated by reference herein in its entirety. In some embodiments, the single lens may include a spherical refractive surface, for example, as is described in U.S. Pat. No. 8,488,044, which is incorporated by reference herein in its entirety, or PCT Application No. PCT/IB2008/001304, filed on Feb. 29, 2008, which is incorporated by reference herein in its entirety.

Optical system 20 has a lateral magnification $M_L$, an axial magnification $MA=(M_L)^2$, an object plane OP in an object space OS and an image plane IP in an image space IS. An object OB is shown in object plane OP and the corresponding image IM formed by optical system 20 is shown in image plane IP. Object OB is at an axial object distance $D_{OB}$ from lens element 22.

Optical system 20 has a depth of field DOF in object space OS over which the object OB can be imaged and remain in focus. Likewise, optical system 20 has a corresponding depth of focus DOF' in image space IS over which image IM of object OB remains in focus. As described herein, an exemplary DOF and DOF' of such an optical system 20 may accommodate the acquisition of iris images within a near field, facial images within a far field, and partially deprecated iris and facial images within a middle field. Object and image planes OP and IP are thus idealizations of the respective positions of object OB and the corresponding image IM and typically correspond to an optimum object position and a "best focus" position, respectively. In actuality, these planes can actually fall anywhere within their respective depth of field DOF and depth of focus DOF', and are typically curved rather than planar. The depth of field DOF and depth of focus DOF' are defined by the properties of optical system 20, and their interrelationship and importance in system 10 is discussed more fully below.

System 10 also includes an image sensor 30 that has a photosensitive surface 32 (e.g., an array of charge-coupled devices) arranged at image plane IP so as receive and detect image IM, which is also referred to herein as an "initial" or a "raw" image. Although any suitable image sensor 30 may be used in accordance with the present disclosure, in an exemplary embodiment image sensor 30 may be or include a high-definition CCD camera or CMOS camera.

In an exemplary embodiment, system 10 further includes a controller 50, such as a computer or like machine, that is adapted (e.g., via instructions such as software embodied in a computer-readable or machine-readable medium) to control the operation of the various components of the system. Controller 50 is configured to control the operation of system 10 and includes an image processing unit ("image processor") 54 electrically connected to image sensor 30 and adapted to receive and process digitized raw image signals SRI therefrom and form processed image signals SPI, as described in greater detail below.

Figure 2:
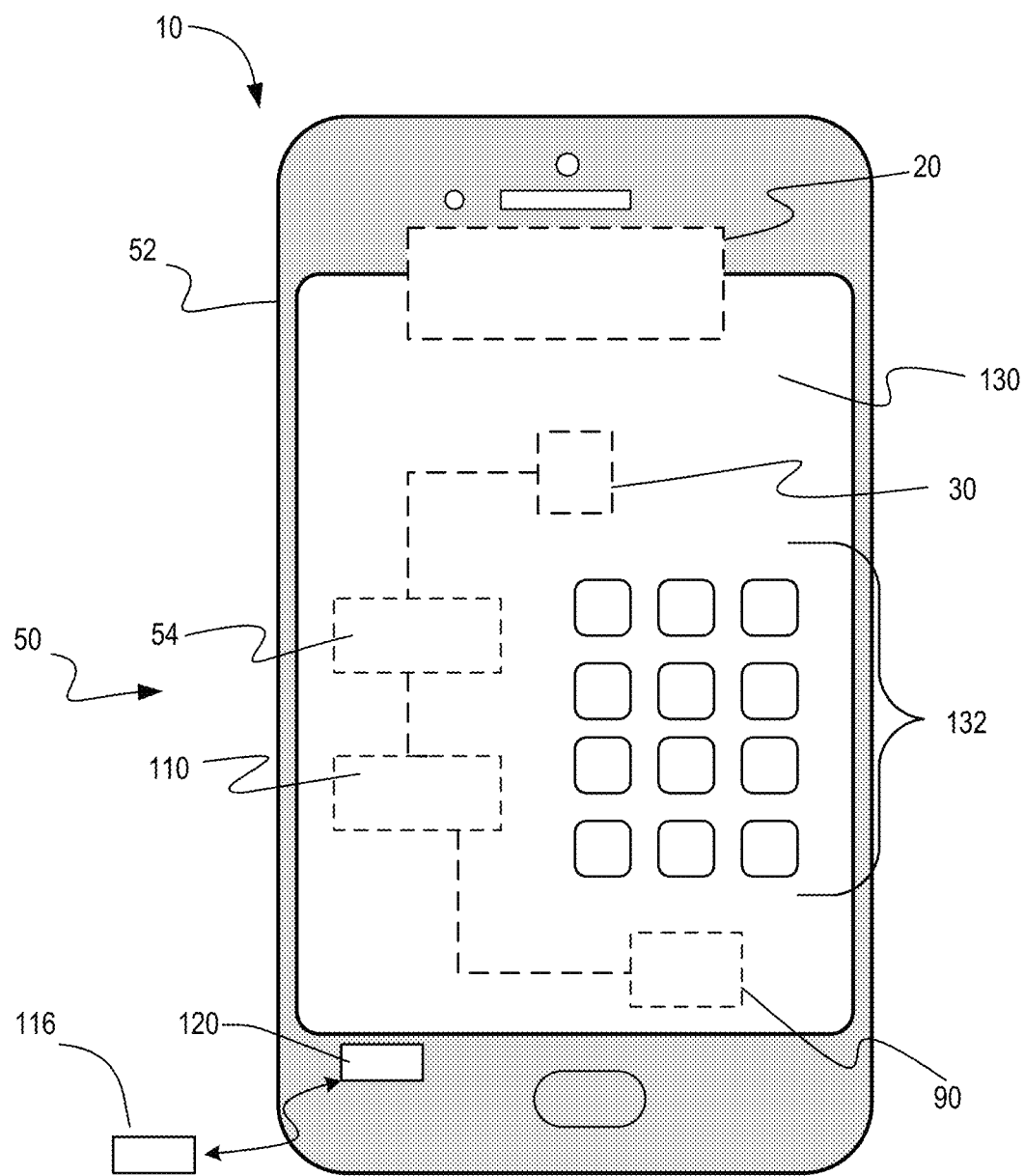
FIG. 2 depicts an exemplary device including embedded biometric detection in accordance with some embodiments of the present disclosure.

Although the inventions described in the present disclosure may be implemented in an any suitable system, in an embodiment, the optical system 20 may be implemented in a hand-held device such as a smart phone. FIG. 2 is a schematic diagram of an exemplary hand-held device 52 that includes system 10, in accordance with some embodiments of the present disclosure. In an exemplary embodiment, controller 50 is or includes one or more processors (e.g., core or application processor, graphic processor, and image processor 54) and includes an operating system such as Microsoft WINDOWS or LINUX.

In an exemplary embodiment, image processor 54 may be or include any suitable processor having processing capability necessary to perform the processing functions described herein, including but not limited to hardware logic, computer readable instructions running on a processor, or any combination thereof. In some embodiments, the processor may include a general- or special-purpose microprocessor, finite state machine, controller, computer, central-processing unit (CPU), field programmable gate array (FPGA), or digital signal processor. Image processor 54 may run software to perform the operations described herein, including software accessed in machine readable form on a tangible non-transitory computer readable storage medium (e.g., flash, RAM, ROM, SRAM, EEPROM, hard drives, etc.), as well as software that describes the configuration of hardware such as hardware description language (HDL) software used for designing chips.

Controller 50 may also include a memory unit ("memory") 110 operably coupled to image processor 54, on which may be stored a series of instructions executable by image processor 54. As used herein, the term "memory" refers to any tangible (or non-transitory) storage medium include disks, thumb drives, and memory, etc., but does not include propagated signals. Tangible computer readable storage mediums may include volatile and non-volatile, removable and non-removable media, such as computer readable instructions, data structures, program modules or other data. Examples of such media include RAM, ROM, EPROM, EEPROM, flash memory, CD-ROM, DVD, disks or optical storage, magnetic storage, or any other non-transitory medium that stores information that is accessed by a processor or computing device. In an exemplary embodiment, controller 50 may include a port or drive 120 adapted to accommodate a removable processor-readable medium 116, such as CD-ROM, DVD, memory stick or like storage medium.

The EDOF methods of the present disclosure may be implemented in various embodiments in a machine-readable medium (e.g., memory 110) comprising machine readable instructions (e.g., computer programs and/or software modules) for causing controller 50 to perform the methods and the controlling operations for operating system 10. In an exemplary embodiment, the computer programs run on image processor 54 out of memory 110, and may be transferred to main memory from permanent storage via disk drive or port 120 when stored on removable media 116, or via a wired or wireless network connection when stored outside of controller 50, or via other types of computer or machine-readable media from which it can be read and utilized. For example, in some embodiments, some or all of the processing described herein may be performed by a remote system that receives raw images, processed images, iris or facial codes, or other data (e.g., scores associated with images) to perform aspects of the processing (e.g., processing of images, generation of iris and facial codes, comparison to code reference databases, etc.) remotely from the hand-held device.

The computer programs and/or software modules may comprise multiple modules or objects to perform the various methods of the present disclosure, and control the operation and function of the various components in system 10. The type of computer programming languages used for the code may vary between procedural code type languages to object-oriented languages. The files or objects need not have a one to one correspondence to the modules or method steps described depending on the desires of the programmer. Further, the method and apparatus may comprise combinations of software, hardware and firmware. Firmware can be downloaded into image processor 54 for implementing the various exemplary embodiments of the disclosure.

Controller 50 may also include a display 130 (e.g., a touch screen display providing various applications and interfaces), which may be any suitable display for displaying information in any suitable manner, for example, using a wide variety of alphanumeric and graphical representations. In an embodiment, the instructions in the memory 110 and/or memory associated with the image processor may include instructions for various applications that may make use of the system iris and facial image capture and processing capabilities 10, such as to provide access to the hand-held device, to provide access to particular applications running on the hand-held device, to assist in setup of a biometric identification system (e.g., to enroll users), or perform other suitable functionality. For example, in some embodiments, display 130 may display raw or enhanced images (e.g., images captured and/or enhanced by system 10), information relating to iris codes, instructions for enrolling users, or possible user matches. Controller 50 may also include a data-entry device 132, which in the embodiment of the hand-held device of FIG. 2, may be embodied as images of a user interface depicted on the touch screen display 130. In some embodiments, data entry device 132 may include any suitable device that allows a user of system 10 to interact with controller 50. For example, a keyboard or touchscreen may allow a user to input information for controller 50 (e.g., the name of the object being imaged, etc.) and to manually control the operation of system 10. In an exemplary embodiment, controller 50 is made sufficiently compact to fit within a small form-factor housing of a handheld or portable device, such as device 52 shown in FIG. 2.

System 10 may also include a database unit 90 operably connected to controller 50. In an embodiment, database unit 90 may include memory unit 92 that serves as a computer-readable medium adapted to receive processed image signals SPI from image processor 54 and store the associated processed digital images of object OB as represented by the processed image signals. In some embodiment, database unit may include iris or facial codes acquired by system 10, and in some embodiments, may include some or all of an iris and/or facial code reference database for use in comparing codes associated with acquired images to known codes for approved users. Memory unit 92 may include any suitable memory as described herein, and may be operably connected to controller 50 in any suitable manner (e.g., locally within system 10 or remotely). In an exemplary embodiment, database unit 90 is included within controller 50, although any suitable portion thereof may be included at other local devices or a remote system.

General Method of Operation

With reference to FIG. 1, in the general operation of system 10, image IM of object OB is formed on photosensitive surface 32 of sensor 30 by optical system 20. Controller 50 sends a control signal S30 to activate image sensor 30 for a given exposure time so that image IM is captured by photosensitive surface 32. Image sensor 30 digitizes this "raw" image IM and creates the electronic raw image signal SRI representative of the raw captured image.

Image processor 54 may be adapted to receive from image sensor 30 digitized electrical raw image signals SRI and collect the corresponding raw images to be stored in compressed format. The data format can be any suitable compressed data format, including standards-based compressed data formats such as ISO INCITS 379 and ISO 19794-6. The images can be stored as native or compressed images (e.g., TIFF, bmp, jpeg, etc.) or in a native raw format (e.g., YUV, RAW10). In some embodiments, the raw images may be processed further, with the processed version(s) of the image being stored instead of or in addition to the raw image. For example, as described herein, in some embodiments the raw image may be enhanced to improve the captured modulation transfer function (MTF) (e.g., for images captured by a system having EDOF optics). In some embodiments such as iris or facial recognition, the images can be processed further to be normalized and/or to generate a compressed iris and/or facial code that is specifically stored in a highly compressed format that represents the iris and or facial pattern only. In an exemplary embodiment, images may be processed in a variety of different image processing paths including image enhancement, normalization, and/or equalization, for example, as is described in U.S. Pat. No. 9,495,590, which is incorporated herein by reference in its entirety.

In some embodiments, the raw image IM can be used directly, i.e., without any processing to enhance the image, or with only minor image processing that does not involve MTF-enhancement. The raw image IM is associated with an EDOF provided by optical system 20 even without additional contrast-enhancing image processing, so that in some exemplary embodiments, system 10 need not utilize some or all of the image-processing capabilities of the system. In some embodiments, as described herein, some aspects of processing for iris or facial recognition may be omitted for images captured with an EDOF system and processed.

In an embodiment, a number N of raw images are collected and averaged (e.g., using image processor 54) in order to form a (digitized) raw image IM' that has reduced noise as compared to any one of the N raw images.

In some embodiments, it may be desired enhance the raw image IM. Image processor 54 may receive and digitally process the electronic raw image signal SRI to form a corresponding contrast-enhanced image embodied in an electronic processed image signal SPI, which is optionally stored in database unit 90.

In some embodiments such as biometric applications, system 10 may compare captured biometric information (e.g., iris and/or facial codes associated with a captured iris and/or facial image and stored in database 90) with known biometric information (e.g., iris and/or facial codes associated with known users and stored in database 90 or remotely). Controller 50 may access the stored processed images or related data (e.g., iris and/or facial codes) from database unit 90 for comparison, as described herein. In an exemplary embodiment of iris and/or facial recognition, compressed data from normalized iris images may be used for comparison. In some embodiments, this high end compressed data can fit in small files or a data block of 5 kB to 10 kB.

Optical System

As discussed above, imaging optical system 20 has a depth of field DOF in object space OS and a depth of focus DOF' in image space IS as defined by the particular design of the optical system. The depth of field DOF and the depth of focus DOF' for conventional optical systems can be ascertained by measuring the evolution of the Point Spread Function (PSF) through focus, and can be established by specifying an amount of loss in resolution R that is deemed acceptable for a given application. The "circle of least confusion" is often taken as the parameter that defines the limit of the depth of focus DOF'.

In the present disclosure, both the depth of field DOF and the depth of focus DOF' may extended by providing optical system 20 with an amount of spherical aberration (SA). In an exemplary embodiment, $0.2\lambda \leq SA \leq 5\lambda$, more preferably $0.2\lambda \leq SA \leq 2\lambda$, and even more preferably $0.2\lambda \leq SA \leq 1\lambda$, where $\lambda$ is an imaging wavelength. In an exemplary embodiment, the amount of spherical aberration SA in the optical system at the imaging wavelength is such that the depth of field DOF or the depth of focus DOF' increases by an amount between 50% and 500% as compared to a diffraction limited optical system. By adding select amounts of spherical aberration SA, the amount of increase in the depth of field DOF can be controlled. The example optical system designs set forth herein add select amounts of spherical aberration SA to increase the depth of field DOF without substantially increasing the adverse impact of other aberrations on image formation. In some embodiments, the spherical aberration SA may be added to a single lens in a manner that enables detection of images within a near field, medium field, and a far field.

Since the depth of field DOF and the depth of focus DOF' are related by the axial magnification $M_A$ and lateral magnification $M_L$ of optical system 20 via the relationships DOF'=($M_A$) DOF=($M_L$)$^2$ DOF, system 10 is said to have an "extended depth of field" for the sake of convenience. One skilled in the art will recognize that this expression also implies that system 10 has an "extended depth of focus" as well. Thus, either the depth of field DOF or the depth of focus DOF' is referred to below, depending on the context of the discussion.

The MTF can also be used in conjunction with the PSF to characterize the depth of focus DOF' by examining the resolution R and image contrast CI of the image through focus. Here, the image contrast is given by $$CI=(I_{MAX}-I_{MIN})/(I_{MAX}+I_{MIN})$$

and is measured for an image of a set of sinusoidal linespace pairs having a particular spatial frequency, where $I_{MAX}$ and $I_{MIN}$ are the maximum and minimum image intensities, respectively. The "best focus" is defined as the image position where the MTF is maximized and where the PSF is the narrowest. When an optical system is free from aberrations (i.e., is diffraction limited), the best focus based on the MTF coincides with the best focus based on the PSF. However, when aberrations are present in an optical system, the best focus positions based on the MTF and PSF can differ.

Conventional lens design principles call for designing an optical system in a manner that seeks to eliminate all aberrations, or to at least balance them to minimize their effect so that the optical system on the whole is substantially free of aberrations. However, in the present disclosure, optical system 20 is intentionally designed to have spherical aberration as a dominant aberration, and may also have a small amount of chromatic aberration as well.

The spherical aberration reduces the contrast of the image by reducing the overall level of the MTF from the base frequency $f_o=0$ to the cutoff frequency fc. The cut off frequency $f_c$ is not significantly reduced as compared to the ideal (i.e., diffraction-limited) MTF, so nearly all the original spatial-frequency spectrum is available. Thus, the spatial-frequency information is still available in the image, albeit with a lower contrast. In some embodiments, the reduced contrast may be restored by the MTF enhancement digital filtering process as carried out by image processing unit 54. In some embodiments, it may not be necessary to perform the MTF enhancement, i.e., an EDOF image with a reduced MTF may be used without MTF enhancement, for example, in some embodiments of iris recognition as described herein.

The amount of spherical aberration SA increases the depth of focus DOF' in the sense that the high spatial frequencies stay available over a greater range of defocus. The processing of the image described herein permits the image to be used for applications such as biometrics (e.g., with or without digital filtering that restores the contrast over the enhanced depth of focus DOF'), thereby effectively enhancing the imaging performance of optical system 20.

Spherical aberration is an "even" aberration in the sense that the wavefront "error" is an even power of the normalized pupil coordinate p. Thus, spherical aberration presents a rotationally symmetric wavefront so that the phase is zero. This means that the resulting Optical Transfer Function (OTF) (which is the Fourier Transform of the PSF) is a rotationally symmetric, real function. The MTF, which is the magnitude of the OTF, can be obtained where spherical aberration is the dominant aberration by considering a one-dimensional MTF measurement taken on a slanted edge. This measurement provides all the required information to restore the two-dimensional image via digital signal processing. Also, the phase is zero at any defocus position, which allows for digital image processing to enhance the MTF without the need to consider the phase component (i.e., the phase transfer function, or PFT) of the OTF in the Fourier (i.e., spatial-frequency) space.

An amount of spherical aberration SA of about $0.2\lambda$–$0.6\lambda$ gives a significant DOF enhancement without forming a zero in the MTF on one defocus side. In the absence of SA a zero occurs on both sides of defocus from the best focus position. For a diffraction-limited optical system, the depth of focus DOF' is given by the relationship DOF'=$\pm\lambda/(NA^2)$, where NA is the numerical aperture of the optical system. In an exemplary embodiment, optical system 20 has an NA between about 0.033 and 0.125 (i.e., about F/15 to about F/4, where F/#=1/(2NA) assuming the small-angle approximation).

By way of example, for F/6.6, a center wavelength of $\lambda_c$ =800 nm and a bandwidth of $\Delta\lambda$, the diffraction-limited depth of focus DOF' is about 20 mm, with a transverse magnification of 1/1.4. The introduction of an amount of spherical aberration SA=$0.75\lambda$, increases the depth of focus DOF' to about 100 mm, an increase of about 5×.

MTF Enhancement

In some embodiments, it may be desired to improve the contrast of a raw image captured with an EDOF system having spherical aberration. In some embodiments, this may be accomplished by filtering the raw images in a manner that restores the MTF as a smooth function that decreases continuously with spatial frequency and that preferably avoids overshoots, ringing and other image artifacts.

Noise amplification is often a problem in any filtering process that seeks to sharpen a signal (e.g., enhance contrast in a digital optical image). Accordingly, in an exemplary embodiment, an optimized gain function (similar to Wiener's filter) that takes in account the power spectrum of noise is applied to reduce noise amplification during the contrast-enhancement process.

In an exemplary embodiment, the gain function applied to the "raw" MTF to form the "output" or "enhanced" MTF (referred to herein as "output MTF") depends on the object distance DOB. The MTF versus distance DOB is acquired by a calibration process wherein the MTF is measured in the expected depth of field DOF by sampling using defocus steps $\delta_F \leq (\frac{1}{8})(\lambda/(NA^2))$ to avoid any undersampling and thus the loss of through-focus information for the MTF. In this instance, the enhanced MTF is said to be "focus-dependent."

In an embodiment, the MTF gain function may not depend on the object distance. Although an MTF gain function may be determined in any suitable manner, in an embodiment the MTF gain function may be estimated based on the ratio of an enhanced MTF target function over the average of the raw MTF within the allocated depth of field. For example, because the typical smooth shape of a desired MTF compared to the MTF of an image acquired by a system having spherical aberration may be known, an approximation may be sufficiently accurate for MTF enhancement.

The above-mentioned MTF gain function used to restore or enhance the raw MTF is a three-dimensional function G(u, v, d), wherein u is the spatial frequency along the X axis, v is the spatial frequency along the Y axis, and d is the distance of the object in the allowed extended depth of field DOF (d thus corresponds to the object distance $D_{OB}$). The rotational symmetry of the PSF and MTF results in a simplified definition of the gain function, namely:

$$G'(\omega, d) \text{ with } \omega^2 = u^2 + v^2$$

The rotational symmetry also makes $G'(\omega, d)$ a real function instead of a complex function in the general case.

The "enhanced" or "restored" OTF is denoted OTF' and is defined as:

$$OTF'(u,v,d) = G(u,v,d) OTF(u,v,d)$$

where OTF is the Optical Transfer Function of the optical system for incoherent light, OTF' is the equivalent OTF of the optical system including the digital processing, and G is the aforementioned MTF gain function. The relationship for the restored or "output" or "enhanced" MTF (i.e., MTF') based on the original or unrestored MTF is given by:

$$MTF'(\omega, d) = G'(\omega, d) MTF(\omega, d)$$

When the object distance is unknown, an optimized average gain function G' can be used. The resulting MTF is enhanced, but is not a function of the object distance.

The after-digital process may be optimized to deliver substantially the same MTF at any distance in the range of the working depth of field DOF. This provides a substantially constant image quality, independent of object distance DOB, so long as DOB is within the depth of field DOF of optical system 20. Because optical system 20 has an extended depth of field DOF due to the presence of spherical aberration as described below, system 10 can accommodate a relatively large variation in object distance DOB and still be able to capture suitable images. Additional processing of images (e.g., image noise reduction by averaging sequential images, image normalization, and code equalization) may be performed to further enhance the usable DOF, for example, using the techniques described in U.S. Pat. No. 9,495,590, which is incorporated herein by reference in its entirety.

Iris and Facial Image Capture and Recognition System

Figure 3:
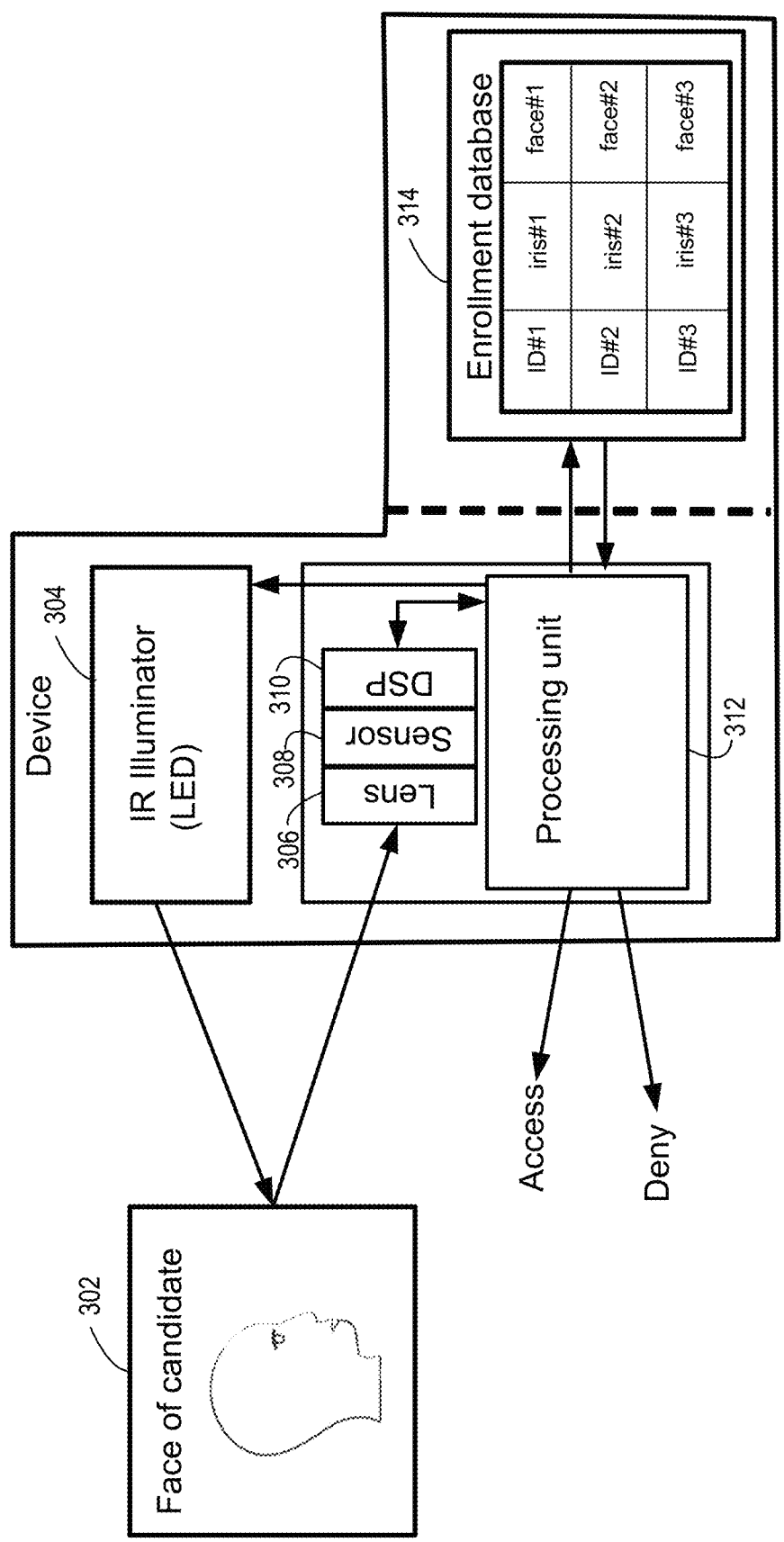
FIG. 3 depicts a block diagram of an exemplary blended iris and facial recognition system in accordance with some embodiments of the present disclosure.

FIG. 3 depicts a block diagram of an exemplary blended iris and facial recognition system in accordance with some embodiments of the present disclosure. Although it will be recognized that a blended iris and facial recognition system may include additional components, that components may be omitted, or that portions of the system may be rearranged in a suitable manner, in the exemplary embodiment of FIG. 3 a blended iris and facial recognition system may include an optical system including an infrared (IR) illuminator, lens, sensor, digital signal processor, processing unit, and enrollment database. As described herein, the components of the optical system depicted in FIG. 3 may be located at one or more devices or systems, including portions located at remote servers or systems.

A candidate 302 may have at least a portion of a face within the field of view of the optical system. An illuminator 304 may be composed of infrared light emitting diodes (LEDs). In exemplary embodiments, the illuminator 304 may be one or multiple LEDs, and may provide infrared illumination within a range of the field of view that includes the depth of field. The LED circuitry can be driven in a continuous waveform (CW) supporting any progressive scan camera or in pulsed mode in the case of use of a global shutter mode on an image sensor. The latter approach may provide efficient temporal rejection of ambient light by reducing the effective exposure time on pixel at the gate-on time of LED supply.

Figure 9A:
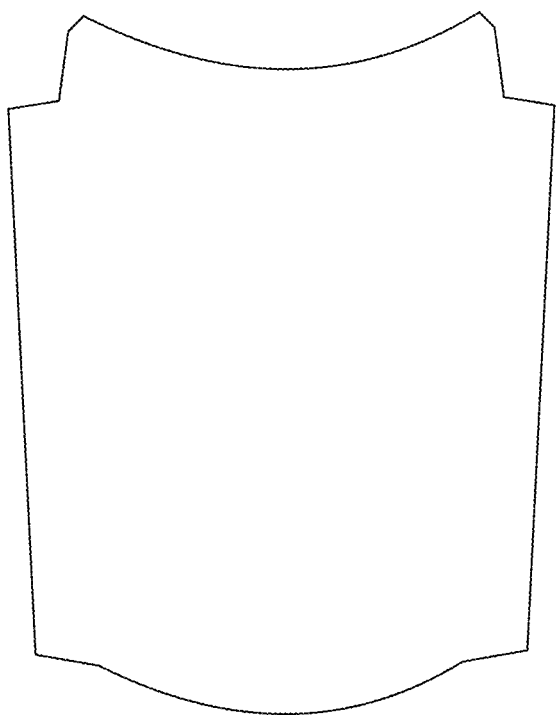
FIGS. 9A and 9B depict exemplary extended depth of field lenses in accordance with some embodiments of the present disclosure.
Figure 9B:
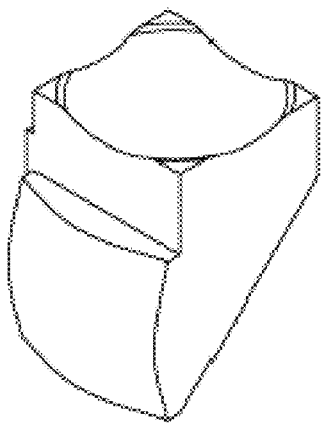

An exemplary lens 306 may be a low aberration lens optimized to perform as close as possible of a diffraction limit for the lens, or in some embodiments may have a controlled level of spherical aberration which may provide an extended depth of field including a range from the near field to the far field. Exemplary lenses are depicted in FIGS. 9A and 9B, and may provide an appropriate amount of spherical aberration in the expected field of view and F#. A typical example at focal length 4.2 mm meets 2 mm of image circle at F2.5. In such a configuration, it may be possible to use HD format image sensors having 2MP (e.g. 1980×1080 pixel) at pixel pitch 1.12 um.

An exemplary image sensor 308 may capture the image of the candidate from the lens 306. In an embodiment, it may be desirable to utilize a sensor having a small pixel size (e.g. pixel sizes in a range of 1.12 um-1.4 um) requiring the shortest focal length for any specified comfortable field of view. In an embodiment, a single lens 306 may be packaged with sensor 308 to form a compact camera module. In applications that do not require compact packaging and minimal size, it may be possible to use larger lenses and/or sensors such as a sensor having a pixel size of up to 6 um, which may provide for additional efficiency for light collection and a lower SNR (Signal to Noise Ratio).

An exemplary digital signal processor (DSP) 310 may drive the sensor, coordinate image capture with illumination, and perform initial processing of the output data stream from the sensor. In an embodiment, the received sensor data may be processed and formatted to be provided to the processing unit 312 via a data bus such as a USB or serial interface. In some embodiments, software running on the DSP may compress the image according to a compression data format such as MPEG to speed up image transfer and increase the frame rate. Typically, the compression allows running the camera at 30 f/s (frame per second) from an original capacity of 5 f/s in a raw format in HD format size. This may facilitate faster identification by transferring the images to the processing unit faster as well as greater accuracy by collecting more images which may be used for averaging or other improved imaging techniques. In other embodiments, it may be desirable not to provide any such compression, e.g., to avoid any deprecation of underlying information as a result of the compression. For example, within certain ranges and for certain techniques, it may be desirable not to perform any compression. An iris image may already have reduced information within a medium field, and it may not be desirable to further deprecate the data by performing a compression.

An exemplary enrollment data base 314 may include iris enrollment data and facial enrollment data. Iris and facial enrollment data may be stored independently for a particular user, or in some embodiments, stored within a single common enrollment data structure. The underlying iris and facial enrollment data may initially be acquired separately based on differing requirements such as level of resolution and distance for accurate capture. For exemplary acquisition of iris enrollment data, it may be desirable for a candidate to locate the iris within a close portion of the near field to get the benefit of the highest resolution (e.g., at least 150 pixels across iris). In an exemplary embodiment of an optical system having a focal length of 4.2 mm and a 2MP sensor at 1.12 um pixel size, a typical distance for iris enrollment may range from 250 mm to 350 mm from the lens. For exemplary acquisition of facial enrollment data, it may be desirable to have the candidate located in a range of the far field where an image of the entire face may be captured. An exemplary range for facial enrollment may be within an appropriate portion of the far field to capture the entire face in a single image with good resolution and illumination. In an exemplary embodiment of an optical system having a focal length of 4.2 mm and a 2MP sensor at 1.12 um pixel size, a typical distance for facial enrollment may range from 700 mm to 1 m from the lens. In such an exemplary system, the facial image is sampled at 3.7 pixel/mm, which is 7.4 times better than the minimum recommendation for resolution by most facial recognition algorithms (e.g., 0.5 pix/mm).

During operation for verification or identification, the illuminator 304 may provide IR illumination within the field of view. Once a candidate enters any one of the near field, medium field, or far field, images may be captured by lens 306, sensor 308, and DSP 310. Images may be captured over a suitable time period, and in some embodiments, may include images from more than one of the near field, medium field, an far field. Based on the type and quality of the captured images, authentication can be performed based iris recognition, facial recognition, or a combination of iris recognition and facial recognition. For example, if all captured images are within the near field the matching and authentication will be performed by iris recognition. Within this range, the illumination level adjusted for optimal use of the dynamic range of the iris may produce direct saturation of the camera on the frontal skin as the skin has a higher albedo than the iris. Thus, within the near field many of the facial features may be obscured, in addition to the fact that many facial features may fall outside of the field of view.

Within the medium field, the resulting images may be suitable to acquire both iris features and facial features. Although the medium field may not be ideal for iris recognition or facial recognition alone, within the medium field both iris recognition and facial recognition may be utilized in combination to improve the overall accuracy of the authentication. The level of illumination may be reduced based on the inverse square of the distance according to the radiometric law of Bouger, which may result in a lower illumination of iris images in the medium field as compared to near field. In some embodiments, dynamic adjustment of the illumination level or the exposure time can be performed based on the location of the candidate within the field of view. By the same token, a reduction in illumination facilitates the successful capture of facial information within the medium field.

As an option improving the quality and the SNR (Signal to Noise Ratio), the optical system may be controlled to provide alternate frames at different exposure levels to optimize the captured signal for features within the dynamic range of the optical system. In an embodiment, iris capture may utilize longer exposure times and/or higher illumination levels to accentuate captured iris features, while facial capture may utilize shorter exposure times and/or lower illumination levels presenting saturation of the camera on skin regions having higher albedo. In some embodiments, these parameters (e.g., exposure time and illumination level) may be modified based on the candidate's location within the field of view. The boundary between the medium field and the far field may correspond to a maximum distance at which iris information may be usefully captured. Beyond the medium field (i.e., within the far field) it may only be possible to capture facial information.

Figure 4:
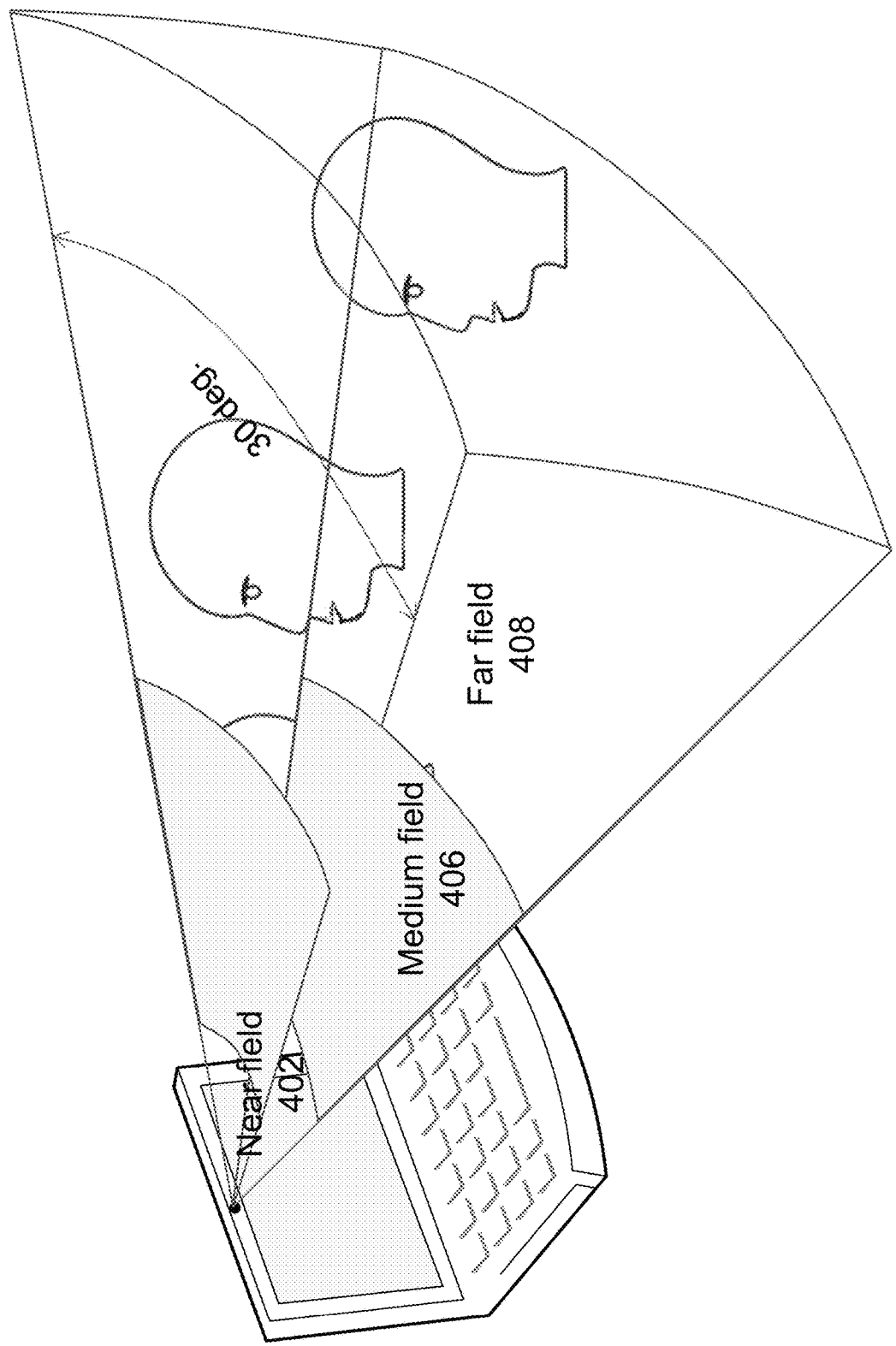
FIG. 4 depicts an exemplary field of view defining a near field, a medium field, and a far field for iris and facial detection for a device having embedded biometric detection in accordance with some embodiments of the present disclosure.

FIG. 4 depicts an exemplary field of view defining a near field, a medium field, and a far field for iris and facial detection for a device having embedded biometric detection in accordance with some embodiments of the present disclosure. Although it will be understood that the optical system of the present disclosure may be implemented in a variety of components and devices as described herein, in the exemplary embodiment of FIG. 4 the optical system may be integrated into a laptop computer. Although a variety of optical system implementations may provide for a variety of imaging capabilities, in the exemplary embodiment of FIG. 4 a single lens having a spherical aberration to provide an enhanced EDOF may be utilized for the optical system, and may provide for an overall useful depth of field ranging from approximately 10 cm-2 m. The exemplary optical system of FIG. 4 may provide a horizontal field of view of approximately 30 degrees and a vertical field of view of approximately 20 degrees, although it will be understood that different imaging systems may provide for a different field of view. In an exemplary embodiment, a suitable range for the near field may be from 100 mm-250 mm, an exemplary range for the medium field may be from 250 mm600 mm, and an exemplary range for the far field may be from 600 mm-2 m.

It may be difficult to capture images within each of the near field, medium field, and far field. Systems that may capture quality images within one of these ranges may not capture images having suitable characteristics within other ranges as a result of the limited depth of field of the system. None of these field regions may be in the best focus simultaneously, requiring a level of compromise on the lens aperture at the cost of losing on the illumination efficiency and increasing diffraction blur. In exemplary embodiments, it may be possible to improve upon the limitations of DOF using auto-focus systems (e.g., having the lens mounted on an actuator) or to utilize an extended depth of field lens solution. The latter approach may be less expensive, more compact, more reliable (e.g., due to fewer moving parts), and may provide a depth of field that encompasses all three of the near field, medium field, and far field.

Within the far field the resolution of the lens represented by the MTF may be more critical with the distance as the facial features to extract are present in higher spatial frequencies. The defocus first effect at far distance may reduce the MTF at the highest spatial frequencies. An exemplary extended depth of field lens system as described herein may reduce this loss of MTF and improve the ability to make successful identification. In an exemplary embodiment of a focal length of 4.2 mm, F2.5, and pixel size of 1.12 um, it may be possible to acquire 32 pixels between the eyes at distances up to 8 m. With an extended depth of field solution such as a thick or folded single lens (e.g., as depicted in FIGS. 9A and 9B) the required MTF may be substantially preserved at distances up to 8 m.

Figure 5:
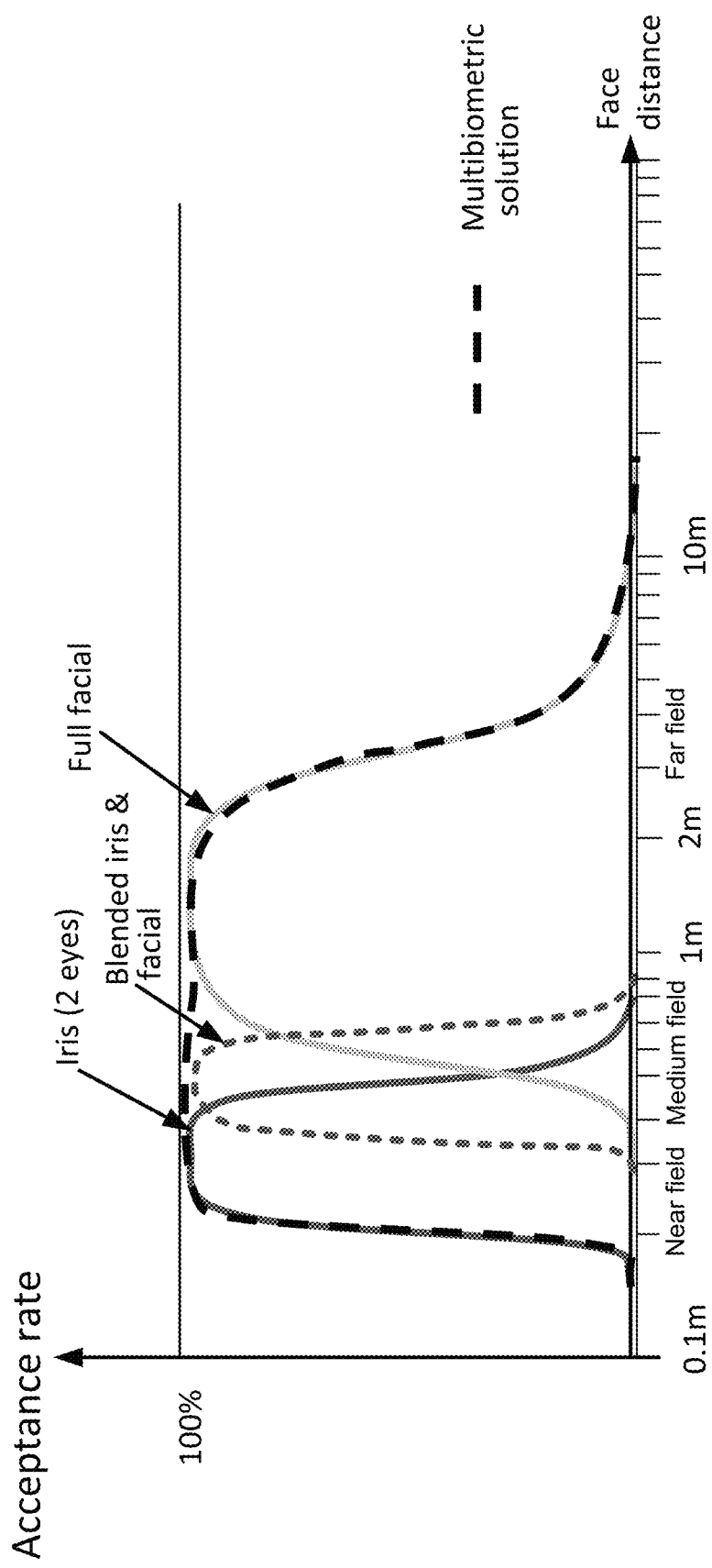
FIG. 5 depicts an exemplary comparison of acceptance rate and distance for iris recognition, facial recognition, and blended iris and facial recognition in accordance with some embodiments of the present disclosure.

FIG. 5 depicts an exemplary comparison of acceptance rate and distance for iris recognition, facial recognition, and blended iris and facial recognition in accordance with some embodiments of the present disclosure. FIG. 5 provides a graphical depiction of this comparison, with the ordinate of FIG. 5 providing a logarithmic scale of distance of the candidate's face from the optical system, and the abscissa of FIG. 5 providing relative acceptance rate for a candidate when compared to known stored images for that candidate. FIG. 5 depicts an exemplary near field having a range between approximately 18 cm-35 cm, a medium field having a range between approximately 35 cm-75 cm, and a far field having a range between approximately 75 cm-2.5 m. Although the near field, medium field, and far field may be described and depicted in FIG. 5 as non-overlapping ranges at particular distances, it will be understood that in some embodiments the ranges may partially overlap, and that the distances may vary based on the configuration of the particular optical system. For example, the exemplary embodiment of FIG. 5 depicts ranges for an exemplary single-lens EDOF system as described herein.

As is depicted in FIG. 5, by utilizing and combining results from the near field, medium field, and far field, a multibiometric solution may result in a continuous solution that provides a high acceptance range throughout the entire DOF, i.e., through the near field, medium field, and far field. This result may be achieved by utilizing each of the iris recognition, facial recognition, and blended recognition solutions in appropriate regions. The near field is supported by capture and extraction of iris feature. Within the medium field region, a blended iris and facial extraction of features working as a biometric solution may combine iris and facial features in a single biometric engine, or in some embodiments, may process iris and facial features independently. The far field is supported by the extraction of facial features only.

Figure 6A:
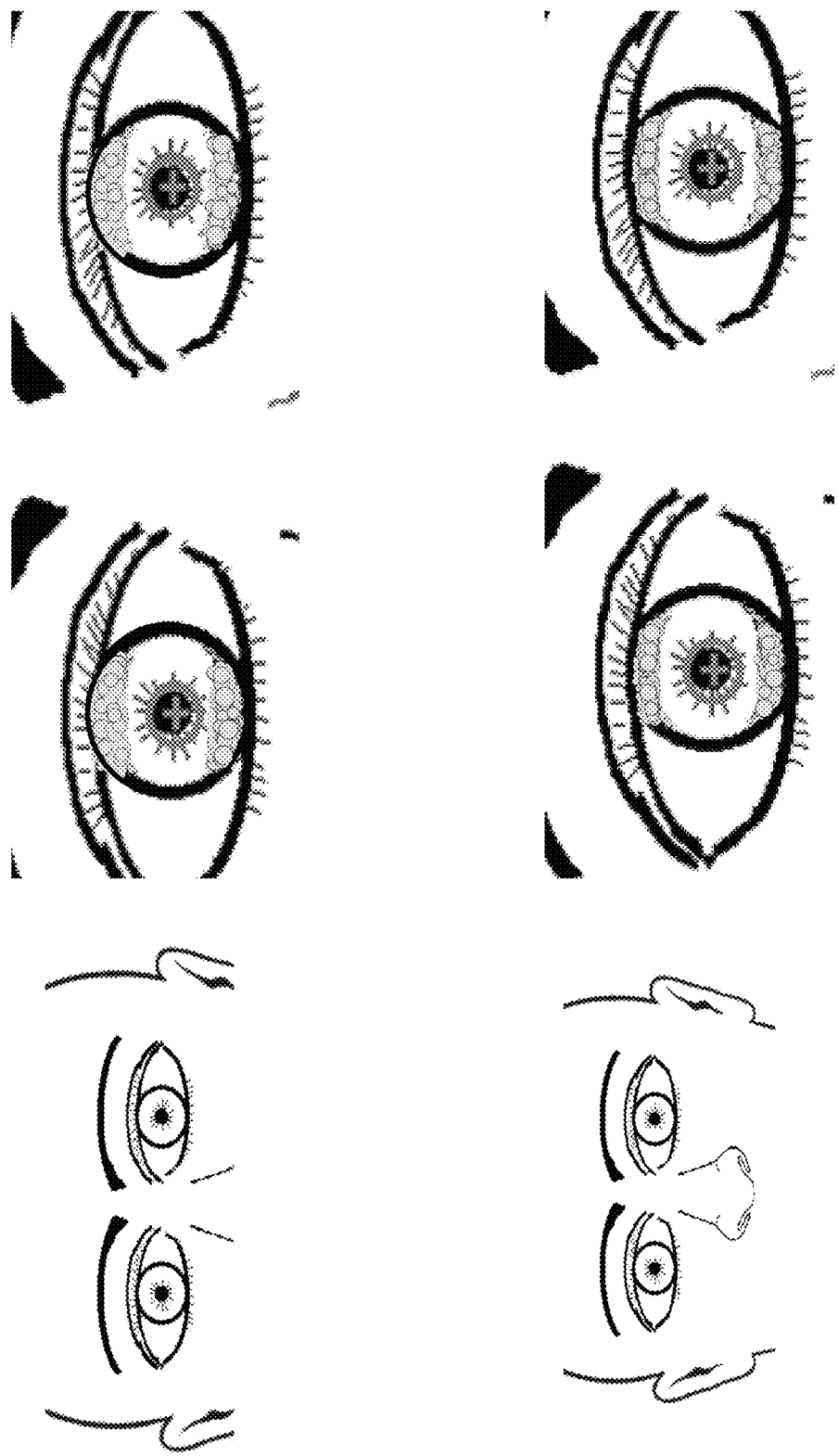
FIG. 6A depicts an exemplary illustration of iris detection within a near field in accordance with some embodiments of the present disclosure.

FIG. 6A depicts an exemplary illustration of iris detection within a near field in accordance with some embodiments of the present disclosure. A left side portion of FIG. 6A provides an exemplary depiction of raw images captured at two different distances within a near field that is captured by the optical system. Each of the two raw images is within a distance within which iris capture and recognition may be accurately performed, with exemplary data points depicted to the right-hand side of FIG. 6A.

Figure 6B:
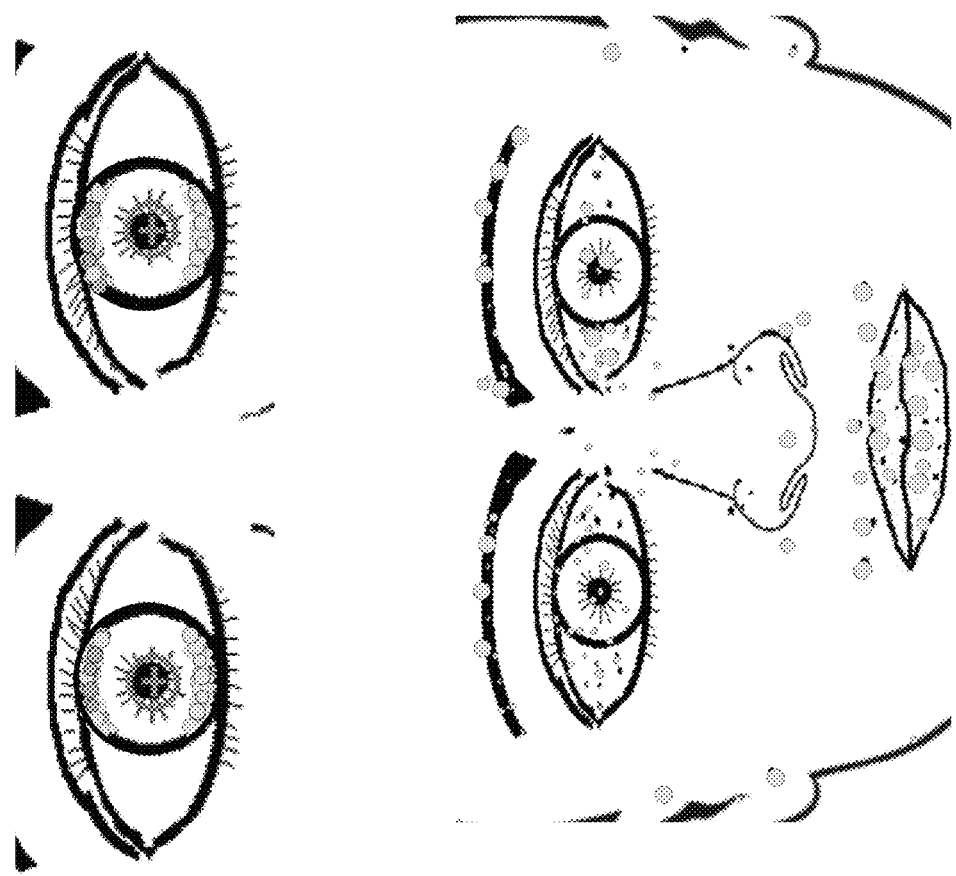
FIG. 6B depicts an exemplary illustration of blended iris and facial detection within a medium field in accordance with some embodiments of the present disclosure.
Figure 6B:
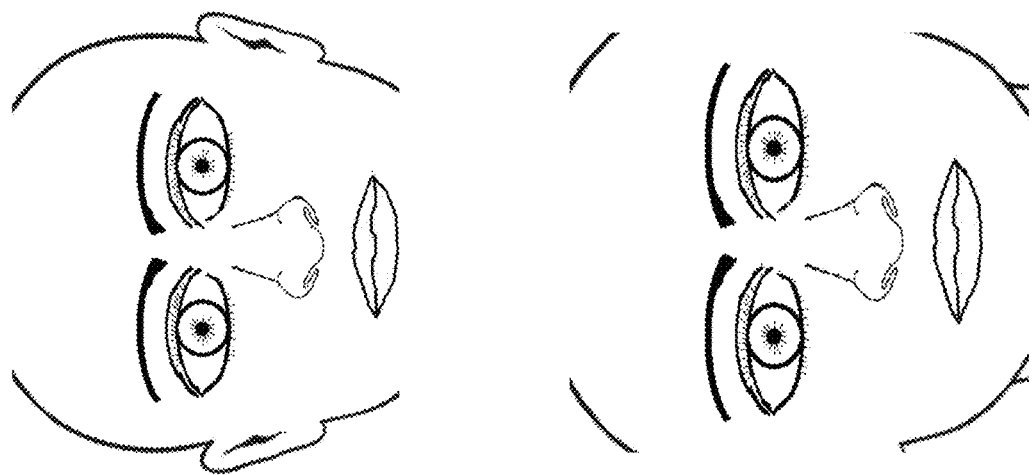

FIG. 6B depicts an exemplary illustration of blended iris and facial detection within a medium field in accordance with some embodiments of the present disclosure. A left side portion of FIG. 6B provides an exemplary depiction of raw images captured at two different distances within a medium field that is captured by the optical system. For each of these raw images, it may be possible to capture a significant portion of both the iris and facial information from the raw images. However, the iris image may lack the resolution of the iris images of FIG. 6A, while the facial image may be incomplete such that at least a portion of the data points required for facial recognition are missing. Thus, exemplary data points for both iris capture and facial capture are depicted to the right-hand side of FIG. 6B.

Figure 6C:
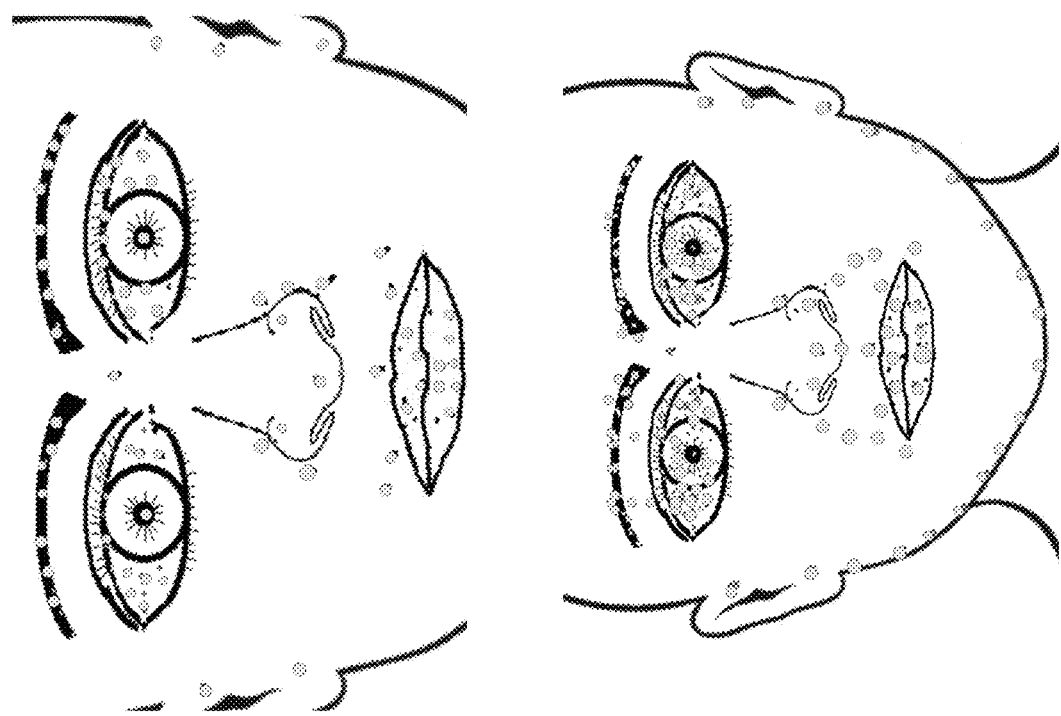
FIG. 6C depicts an exemplary illustration of facial detection within a far field in accordance with some embodiments of the present disclosure.
Figure 6C:
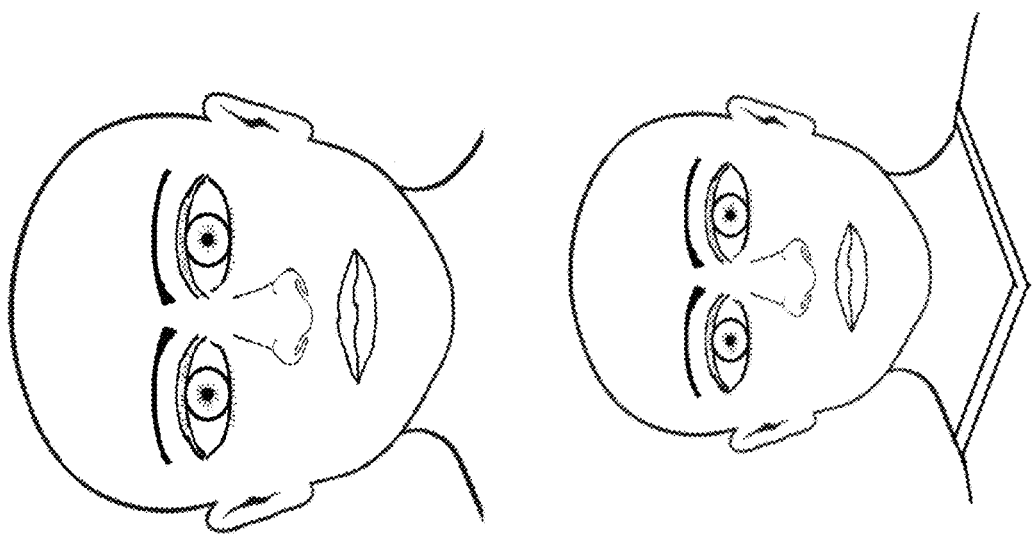

FIG. 6C depicts an exemplary illustration of facial detection within a far field in accordance with some embodiments of the present disclosure. A left side portion of FIG. 6C provides an exemplary depiction of raw images captured at two different distances within a far field that is captured by the optical system. Each of the two raw images is within a distance within which facial capture and recognition may be accurately performed, with exemplary data points depicted to the right-hand side of FIG. 6C.

Figure 7A:
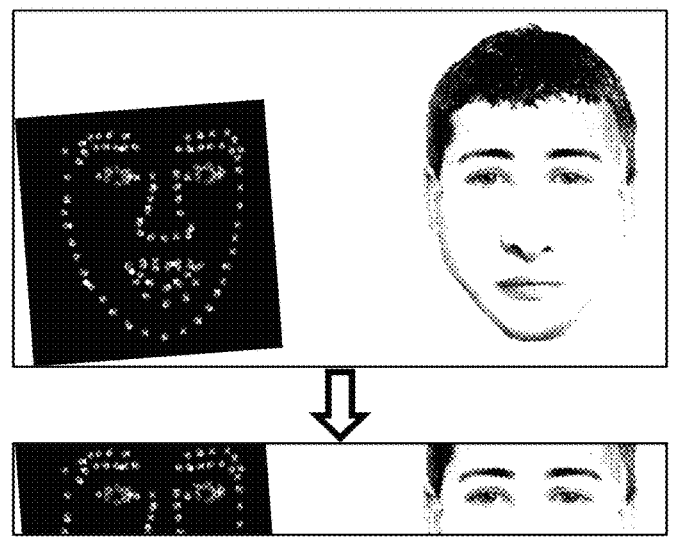
FIG. 7A depicts an exemplary illustration of partial facial detection in accordance with some embodiments of the present disclosure.
Figure 7B:
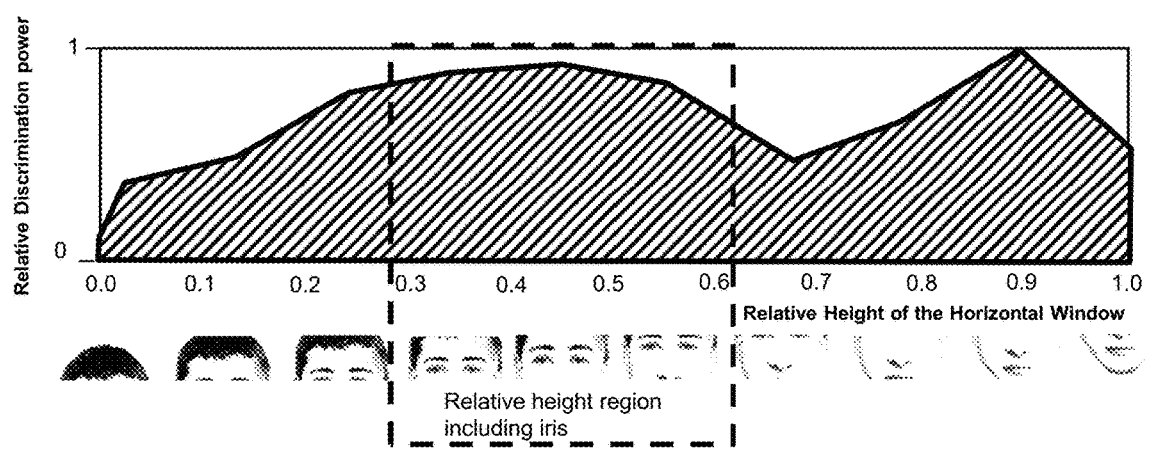
FIG. 7B a variety of data points for partial facial images with a relative ability to discriminate the candidate as compared to a complete facial image in accordance with some embodiments of the present disclosure.

FIGS. 7A-7B depict an exemplary illustration of partial facial detection in accordance with some embodiments of the present disclosure. As described herein, there may be captured images (e.g., within the medium field) that capture only a portion of the candidate's face for analysis. The upper portion of FIG. 7A depicts a complete facial image and associated data points for analysis, for example, as may be acquired within a far field as described herein. A lower portion of FIG. 7A depicts a partial facial image and associated data points for analysis, for example, as may be collected within a medium field (or in some embodiments, within a far field where portion of the face is outside of the field of view).

FIG. 7B depicts a variety of data points for partial facial images with a relative ability to discriminate the candidate as compared to a complete facial image, for different portions of the face captured by different partial facial images. Moving from left to right, the depicted images initially correspond to the top portion of the candidate's face, and move down the candidate's face until the partial facial image only encompasses the lower portion of the candidate's face. As can be seen from the graph of relative discrimination value corresponding to the facial images, an optimum region for analysis of partial facial images corresponds to approximately 28%-62% down the candidate's face, which generally corresponds to an image that captures at least the eyes as well as significant forehead and/or nose portions of the candidate. Other partial facial portions that provide for strong discrimination value include a portion that captures most of the mouth and nose, for example, at approximately 90% down the candidate's face.

In some embodiments, the relative weighting of iris and facial recognition techniques within the medium field may be modified based on the partial facial region that is captured by the optical system. For example, when the eyes are partially open (e.g., when blinking or oriented in a direction forming a significant angle with the direction of the camera), the iris feature extraction may be limited or corrupted. In this situation, the weight on facial features discrimination will be higher. In some embodiments, excessive brightness on the candidate's face may corrupt some facial features by saturation. In such an embodiment within the medium field, higher weight may be accorded to the iris recognition aspect of the image capture and analysis. The internal management of collected iris and facial features can be processed in a variety ways to converge into higher accuracy and acceptance rate than using only iris features or facial features at the same distance. In some embodiments, an Eigenface approach may be utilized to perform recognition of any full or partial facial images.

The exemplary embodiment of FIGS. 7A-7B depicts a typical Relative Discriminant Power of a partial facial image as a function of the corresponding ROI achieved using a linear discriminant analysis (LDA) approach. In some embodiments, the capability of providing discriminant power on a partial facial image is not limited to the LDA method. Other facial algorithms built on an Eigenface approach may perform this function, as the Eigen vectors include subgroups of vectors having reduced projection overlap on the real face image. An intrinsic selection of Eigen features may be utilized to calculate some similarity output when matching enrolled faces.

Figure 8:
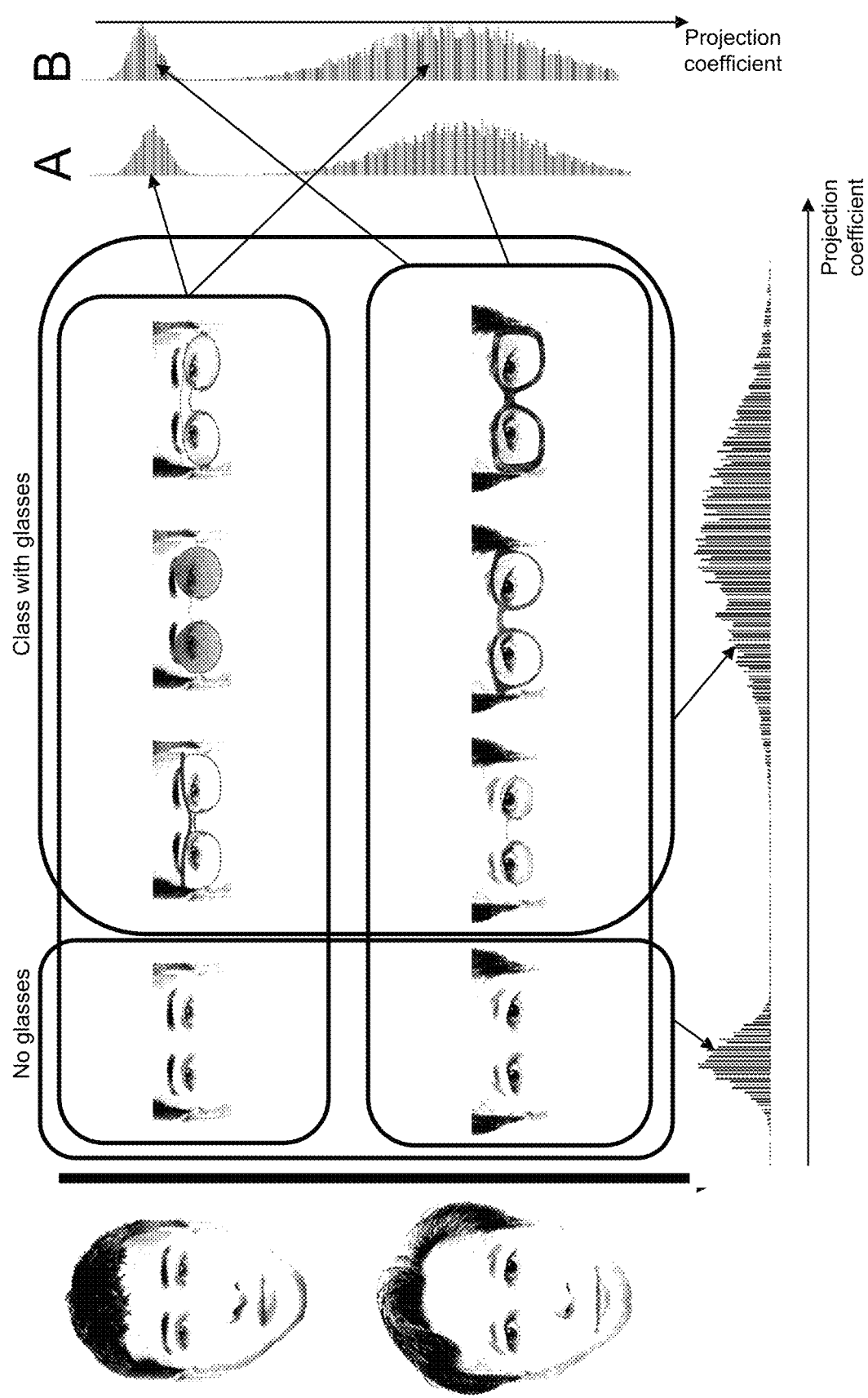
FIG. 8 depicts an exemplary illustration of facial detection with facial obstructions in accordance with some embodiments of the present disclosure.

FIG. 8 depicts an exemplary illustration of facial detection with facial obstructions in accordance with some embodiments of the present disclosure. In some instances, a candidate may be wearing clothes or accessories that interfere with the identification of full or partial facial features. Accordingly, it may be necessary to compensate for such features, as is depicted in FIG. 8.

In the illustration of FIG. 8, two candidates A and B are represented. In the first column, the candidates do not have glasses, while the three other columns depict an exemplary obstruction of glasses having various sizes and shapes. In an embodiment, an appropriate training algorithm can build Eigen vectors producing optimal discriminant coefficients for handling such obstructions. A discriminant vector may be selected in a manner to produce coefficients having statistical repartition by candidate. In an embodiment, the coefficients may result in a low overlap as is represented on the right distribution plot and another discriminant Eigen vector used for low overlap between groups of images having glasses and not having regardless of the candidate. The plot of statistical distribution of coefficients in each class of images (with and without glasses) is represented in the bottom. This approach provides efficient discriminant functions minimizing the impact of wide kinds of variations locally produced by the glasses that are intrinsically independent of the iris or facial features to extract. From this general approach, a variety of facial recognition algorithms can be utilized, such PCA (Principal Component Analysis), ICA (Independent Component Analysis), LDA (Linear Discriminant Analysis), EP (Evolutionary Pursuit), EBGM (Elastic Bunch Graph Matching), or other suitable facial recognition algorithms known to those skilled in the art of facial recognition.

FIGS. 9A and 9B depict exemplary extended depth of field lenses in accordance with some embodiments of the present disclosure. In exemplary embodiments, each of the lenses of FIGS. 9A and 9B may have a suitable spherical aberration to provide an extended depth of field within a range that captures all of the near field, medium field, and far field. In an exemplary embodiment, FIG. 9A may correspond to a thick single lens, such as that depicted and described in U.S. Pat. No. 8,416,334, which is incorporated by reference in its entirety. FIG. 9B may correspond to a "folded" version of the thick single lens having similar optical characteristics but being folded to reduce the lens size while providing an effective optical length similar to that of the thick single lens of FIG. 9A.

Figure 10:
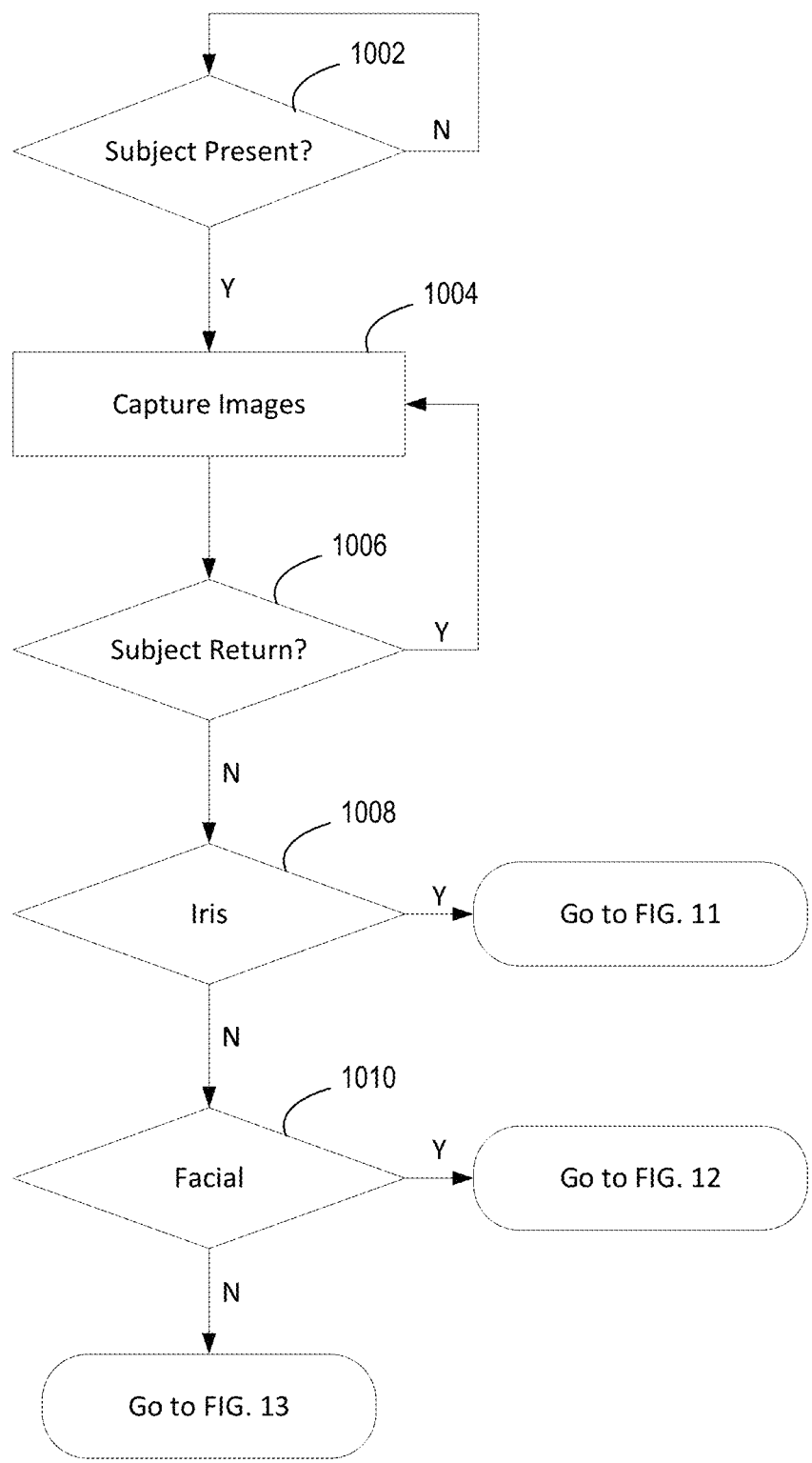
FIG. 10 depicts exemplary steps for acquiring images and selecting a biometric verification method in accordance with some embodiments of the present disclosure.

FIGS. 10-14 depict and describe method for performing blended iris and facial recognition in accordance with some embodiments of the present disclosure. While the present disclosure may depict and describe particular steps in a particular order, it will be understood by a person having ordinary skill in the art that it may be possible for one or more steps to be added or removed, or for the flow of the steps to be modified in a variety of ways in accordance with the present specification in view of the present disclosure FIG. 10 depicts exemplary steps for acquiring images and selecting a biometric verification method in accordance with some embodiments of the present disclosure. At step 1002, it may be determined whether a candidate is present within the field of view (e.g., based on analysis of a captured image or based on a secondary sensor). If the candidate is located within the field of view, processing may continue to step 1004. If the candidate is not located within the field of view processing may remain at step 1002 until a candidate enters the field of view.

At step 1004, images of the candidate may be captured. In some embodiments, optical characteristics of the optical system may be modified based on imaging conditions (e.g., environmental conditions, etc.) or information about the candidate (e.g., location within the field of view). In this manner, parameters such as focus, illumination, and exposure time may be modified to optimize image capture (e.g., for iris vs. facial capture). In some embodiments, multiple images may be captured over a period of time, for example, a fixed period of time or based on the candidate's location within the field of view and pace of movement through the field of view. Once images have been captured, processing may continue to step 1006

In step 1006, in some embodiments, it may be determined whether a candidate that exited the field of view returned to the field of view. For example, images may have been captured that provide an initial identification of a candidate that has a lower probability of a match. If the candidate returns to the field of view (e.g., within a threshold time limit) and a preliminary analysis of initial images indicates a significant probability that the candidate is the same candidate for whom images were recently captured, processing may return to step 1004 to capture additional images for the candidate. Otherwise, processing may continue to step 1008.

At step 1008, it may be determined whether to perform matching utilizing only iris information. In some embodiments, all captured images may be within a near field, or a significant majority of captured images may be in the near field. In such instances processing may be performed only on the captured iris images, and processing may continue to the processing of FIG. 11. If facial information may be used, processing may continue to step 1010.

At step 1010, it may be determined whether to perform matching utilizing only facial information. In some embodiments, all captured images may be within a far field, or a significant majority of captured images may be in the far field. In such instances processing may be performed only on the captured facial images, and processing may continue to the processing of FIG. 12. If facial information and iris information are both to be used (e.g., captured images are within a medium field or images from a plurality of the near field, far field, and medium field are to be used for processing), processing may continue to the processing of FIG. 13.

Figure 11:
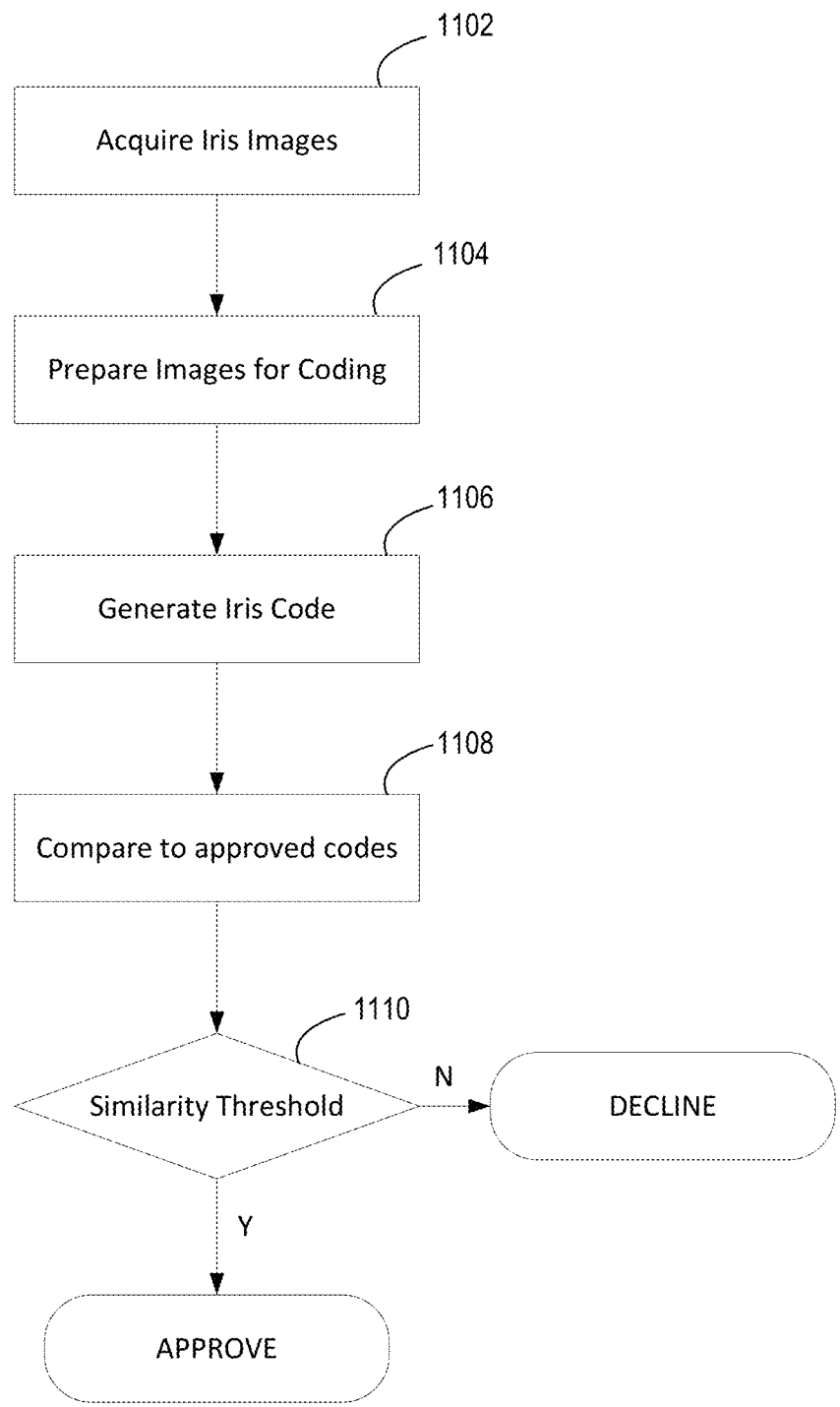
FIG. 11 depicts exemplary steps for performing iris recognition within a near field in accordance with some embodiments of the present disclosure.

FIG. 11 depicts exemplary steps for performing iris recognition within a near field in accordance with some embodiments of the present disclosure. At step 1102, one or more iris images may be captured. In some embodiments aspects of the optical system may be optimized for iris capture, such as by modifying (e.g., increasing) exposure time and/or illumination. Once the iris images have been captured, processing may continue to step 1104.

At step 1104, the captured iris images may be prepared for iris coding. In some embodiments, a variety of techniques such as averaging, MTF enhancement, normalization, and/or equalization may be performed to prepare images for generation of iris codes. Once the iris images are prepared for iris coding, processing may continue to step 1106.

At step 1106, an iris code may be generated for the captured and processed iris images. In an embodiment, the iris code may represent unique iris information associated with a user in a compressed digital form. Once the iris code is generated at step 1106, processing may continue to step 1108.

At step 1108, the generated iris code for the candidate may be compared to enrolled iris codes (e.g., accessed from an enrollment database). Processing may continue to step 1110, at which it is determined whether the candidate's iris code matches an enrolled iris code within a required confidence level or threshold (e.g., based on a Hamming distance between the candidate's iris code and an enrolled iris code). If the candidate's iris code is a match, the candidate may be approved based on any permissions that are associated with the enrolled iris code. If the candidate's iris code is not a match, access to the desired resources (e.g., physical door access, access to electronic resources, etc.) may be denied.

Figure 12:
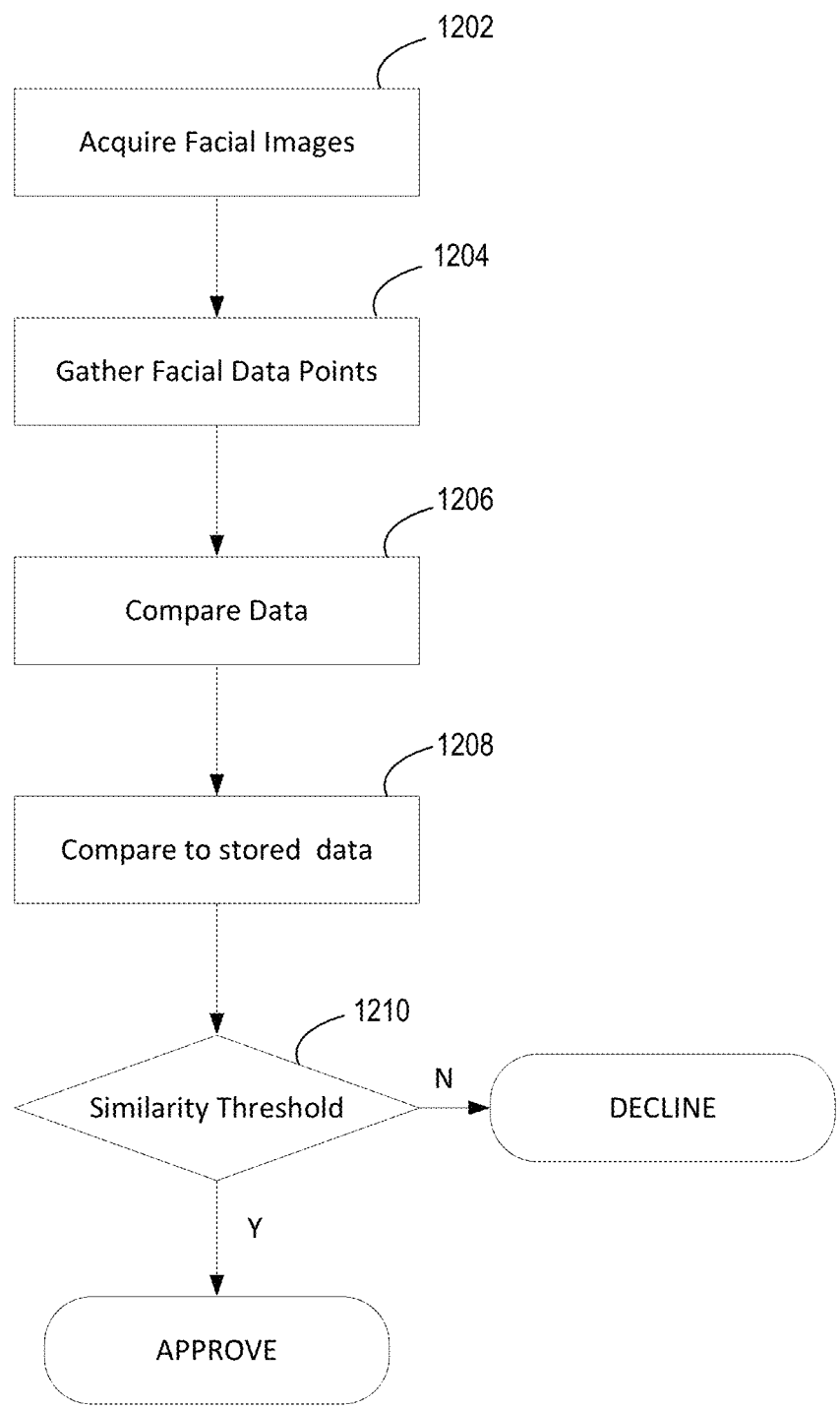
FIG. 12 depicts exemplary steps for performing facial recognition within a far field in accordance with some embodiments of the present disclosure.

FIG. 12 depicts exemplary steps for performing facial recognition within a far field in accordance with some embodiments of the present disclosure. At step 1202, one or more facial images may be captured. In some embodiments aspects of the optical system may be optimized for facial capture, such as by modifying (e.g., decreasing) exposure time and/or illumination. Once the facial images have been captured, processing may continue to step 1204.

At step 1204, the captured facial images may be prepared for facial coding. In some embodiments, a variety of techniques such as averaging, MTF enhancement, normalization, and/or equalization may be performed to prepare images for generation of facial data for comparison. Once the facial images are prepared for facial analysis, processing may continue to step 1206.

At step 1206, facial comparison data may be generated for the captured and processed facial images. In an embodiment, the facial comparison data may include representations of particular facial features such as locations and shape of a user's nose, eyes, mouth, forehead, etc. Once the facial comparison data is generated at step 1206, processing may continue to step 1208.

At step 1208, the generated facial comparison data for the candidate may be compared to enrolled facial comparison data (e.g., accessed from an enrollment database). Processing may continue to step 1210, at which it is determined whether the candidate's facial comparison data matches an enrolled facial code within a required confidence level or threshold. If the candidate's facial data is a match, the candidate may be approved based on any permissions that are associated with the enrolled facial data. If the candidate's facial data is not a match, access to the desired resources (e.g., physical door access, access to electronic resources, etc.) may be denied.

Figure 13:
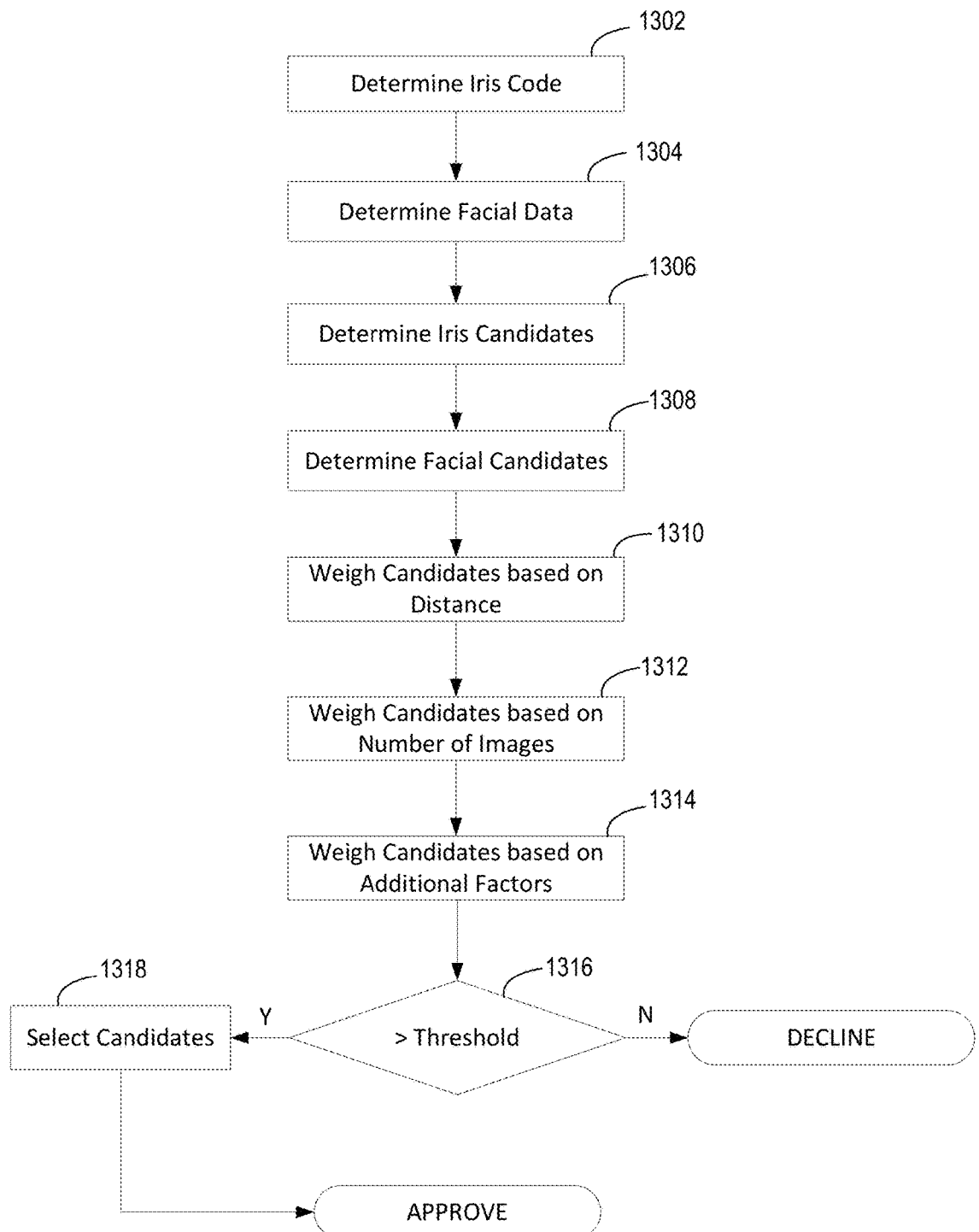
FIG. 13 depicts exemplary steps for performing blended iris and facial recognition in accordance with some embodiments of the present disclosure.

FIG. 13 depicts exemplary steps for performing blended iris and facial recognition in accordance with some embodiments of the present disclosure. Although a particular methodology is described with respect to FIG. 13, a person having ordinary skill in the art will recognize that the particular steps described in FIG. 13 are exemplary only. For example, in some embodiments, a single combined data set may be determined for facial and iris information, that may be compared to combined enrollment data (e.g., rather than or in addition to performing individual comparisons).

At step 1302, any images for which an iris image is available (e.g., within a near field or medium field) may be processed and analyzed as described herein to generate one or more iris codes. Processing may continue to step 1304, at which any images for which a facial image is available (e.g., within a far field or medium field) may be processed and analyzed as described herein to generate facial data for comparison. Processing may then continue to step 1306.

At step 1306, a set of iris candidate images may be determined based on the iris codes=from step 1302. In an embodiment, candidate images may correspond to iris codes that have a probability of a match that exceeds a threshold (e.g., based on a Hamming distance). In an embodiment, the threshold may be lower than a threshold for iris recognition alone. Processing may then continue to step 1308.

At step 1308, a set of facial candidate images may be determined based on the facial data from step 1304. In an embodiment, candidate images may correspond to facial data that has a probability of a match that exceeds a threshold. In an embodiment, the threshold may be lower than a threshold for facial recognition alone. Processing may then continue to step 1310.

Steps 1310-1314 may apply a number of weights to candidate images based on factors indicated in those steps. It will be understood that additional factors such as environmental conditions, imaging conditions, availability of enrollment data, confidence in enrollment data, optical system configuration, and other suitable factors may be utilized to provide weighting to iris and facial images. At step 1310, the candidates may be weighted based on the distance of the images from the optical system. Iris images may receive higher weights if located within the near field or a portion of the medium field that is adjacent to the near field, while facial images may receive higher weights if located within the far field or a portion of the medium field that is adjacent to the far field. Processing may then continue to step 1312.

At step 1312 images may be weighted based on a number of images at a similar location, e.g., that are available to provide for averaging to improve image quality. In this manner, averaging may provide for improvement of images that are not in a preferred portion of the field of view. Processing may then continue to step 1314, in which other factors (e.g., environmental conditions, imaging conditions, availability of enrollment data, confidence in enrollment data, optical system configuration, and other suitable factors) may be utilized to provided weighting for the images. Once proper weighting factors have been applied to the images, processing may continue to step 1316.

At step 1316, the combined weighting of the images, along with their relative probabilities of a match, may be compared to a threshold. If the overall probability of a match exceeds the threshold, processing may continue to step 1318 in which the candidate is matched to enrollment data and approved. If the threshold is not exceeded, the candidate may be denied access to the resource.

Figure 14:
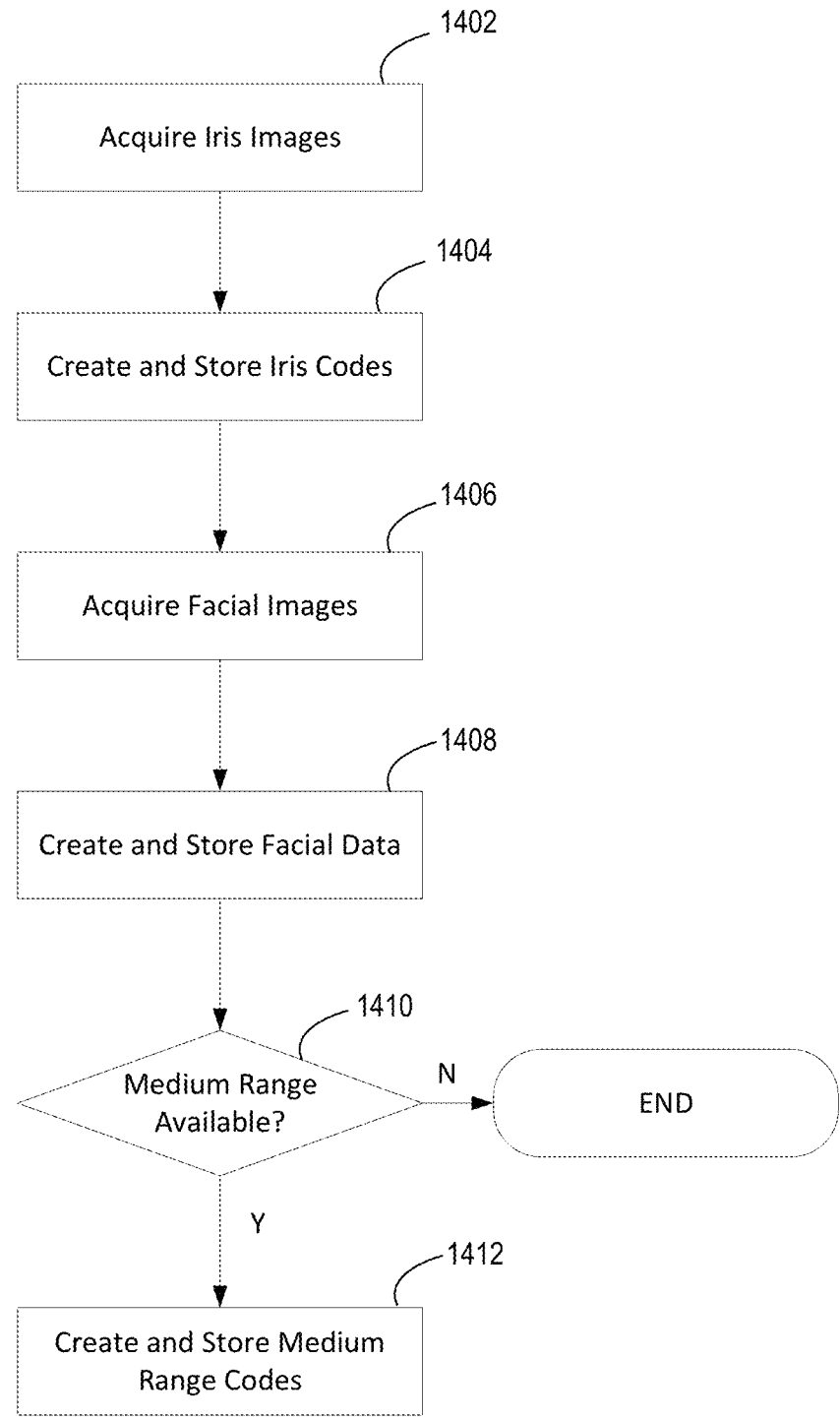
FIG. 14 depicts exemplary steps for enrollment in a blended iris and facial biometric system in accordance with some embodiments of the present disclosure.

FIG. 14 depicts exemplary steps for enrollment in a blended iris and facial biometric system in accordance with some embodiments of the present disclosure. In a blended iris and facial biometric system it may be desired to capture enrollment images and create associated codes and/or data for use for later comparison to acquired data. At step 1402, a user being enrolled in the system may provide iris images that are captured by an optical system. In some embodiments, the system used for acquisition and enrollment may be the same system or may have similar optical properties as the system that is later used for candidate image capture and comparison. In some embodiments, an enrollment procedure may facilitate the capture of accurate images, e.g., by requiring the user to be located at a particular location relative to the optical system (e.g., at an appropriate location within the near field). Once the iris images are acquired, processing may continue to step 1404. At step 1404, iris codes may be created based on the captured iris images, and stored in an enrollment database for later use and analysis. Processing may then continue to step 1406.

At step 1406, a user being enrolled in the system may provide facial images that are captured by the optical system. In some embodiments, an enrollment procedure may facilitate the capture of accurate images, e.g., by requiring the user to be located at a particular location relative to the optical system for the capture of facial images (e.g., at an appropriate location within the far field). Once the facial images are acquired, processing may continue to step 1408. At step 1408, facial data may be created based on the captured facial images, and stored in an enrollment database for later use and analysis. Processing may then continue to step 1410.

At step 1410, it may be determined whether to capture images in a medium field. If images are to be captured in the medium field, processing may continue to step 1412. If images are not to be captured in the medium field, processing may end. In some embodiments, one or both of iris and facial images may be captured within the medium field, such that the resulting iris codes or facial data include similar characteristics (e.g., including partially deprecated information) as an image captured during identification of a candidate. In some embodiments and under certain security settings, such a medium field comparison may require a lower probability that the identification is correct. In some embodiments, a composite image and composite comparison data may be based on both facial and iris information. By including both iris and facial data points within the enrollment data set, accuracy of identification within the medium field may be improved.

Figure 15:
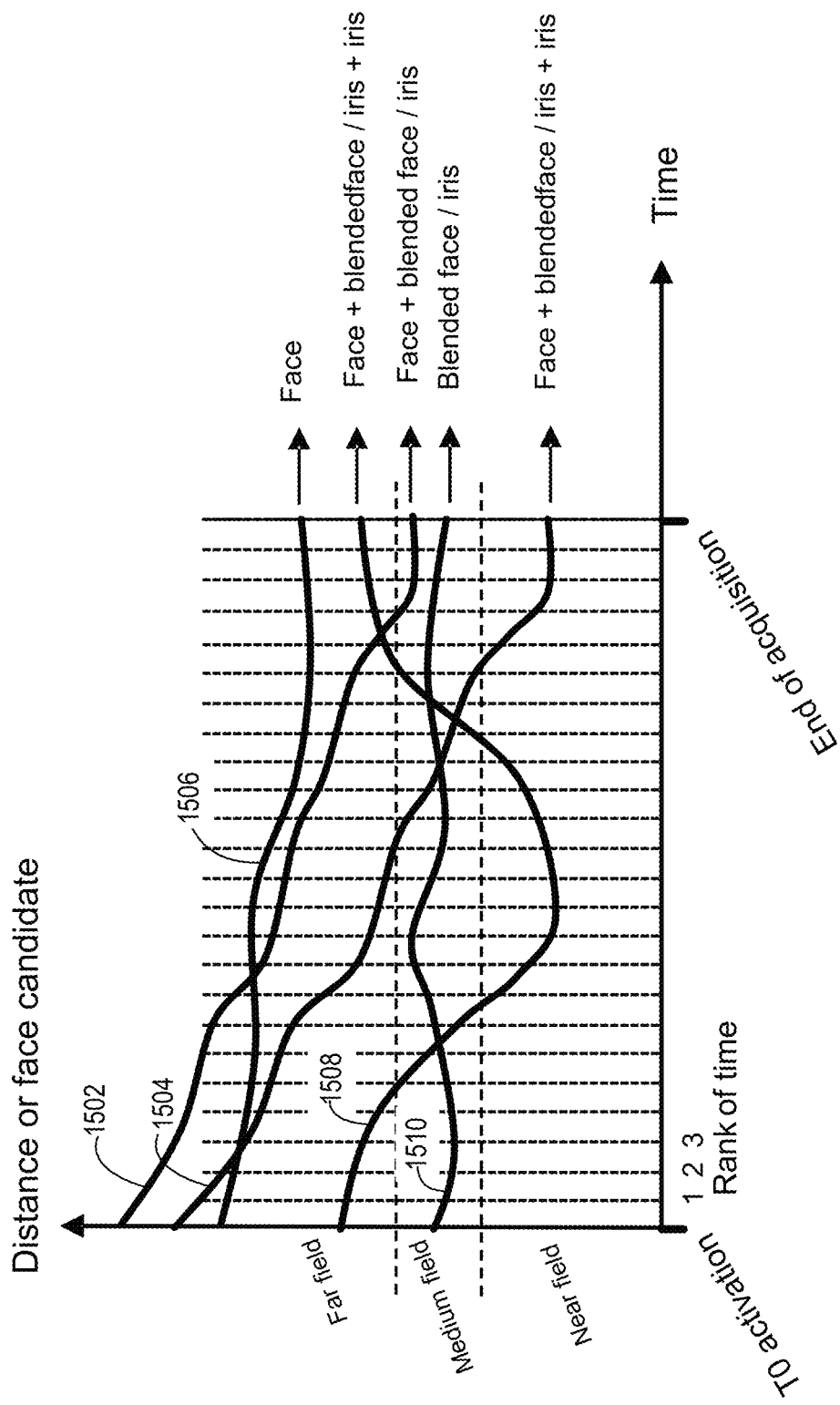
FIG. 15 depicts an exemplary plot of multiple image capture over time for facial recognition, iris recognition, and blended iris and facial recognition.

FIG. 15 depicts an exemplary plot of multiple image capture over time for facial recognition, iris recognition, and blended iris and facial recognition. The abscissa of FIG. 15 may be in units of time, beginning with time zero (T0) at which image capture begins and ending at the conclusion of image capture. Exemplary suitable times for such acquisition may range from a millisecond range (e.g., 200 ms) to a few seconds. The ordinate of FIG. 15 may correspond to a candidate's distance from the optical system at a particular time. If images are captured over a period of time, a candidate may move within the field of view, and thus, FIG. 15 represents five exemplary candidates 1502, 1504, 1506, 1508, and 1510.

In an embodiment, the activation of the optical system may be triggered by detection of the presence of a face candidate in the field of view, for example, based on periodic analysis of images or an external detection mechanism (e.g., proximity sensor, user request, time-of flight sensor, infrared sensor, etc.). Depending on the application, the initial distance may typically start at a further distance (e.g., automated access control system) or a closer distance (e.g., smartphone access system). In any such application, the distance of the candidates face to the optical system may change over time as the candidate moves within the field of view.

At time T0 the system may initially determine which of the three categories of field the candidate is currently occupying. This may be performed based on the image itself, or in some embodiments, by one or more external sensors or detection methods. In an exemplary embodiment, tracking of face and eyes in the image may be utilized to determine the distance and hence the appropriate field for analysis. In an embodiment, when the eyes are detected, a measurement in the image of the distance in pixels separating the two eyes in the field of view can be used directly with a calibrated triangulation method based on the average distance between eyes of approximately 65 mm. When only one eye is visible within an image, an average iris diameter of approximately 11 mm may be utilized to confirm distance.

The system may begin capturing images starting at T0. The FIG. 15 shows traces for exemplary candidates 1502-1510 as a distance in function of time. Images may be captured at a variety rates, for example, based on processing limitations or physical limitations such as a camera frame rate. By capturing multiple images at different distances and within different regions, the accuracy of the system may be improved and preliminary identifications (e.g., from initial images captured at the begin of the capture period) may be confirmed by later images, providing an accurate decision at the conclusion of the capture period. In some embodiments, an administrator may select appropriate settings for analysis, such as thresholds for accuracy of identification, image quality, capture period, preferred capture method, relative weight accorded to different identification techniques, and other similar parameters as described herein. In some embodiments, an administrator may select preferences for iris recognition, facial recognition, or blended iris and facial recognition.

In an exemplary embodiment (e.g., an access system) of a candidate approaching the device from far to near field, the first biometric treatment will be the acquisition and process of facial features. This may enable an initial pure facial recognition that can be used at an early stage before the face comes into the medium field enabling the capture of some iris features. An initial identification based on the facial features may be confirmed based on a blended solution acquired within the medium field, or in some embodiments, probabilities determined from a variety of images (and image averaging within a field) may be used for recognition. If the face moves into the near field, the iris features can be extracted from the near field images in greater detail, further reducing an error rate and improving accuracy. Thus, the error rate may be reduced at least based on the product of the error rate of facial recognition and the error rate of iris recognition in case of independent biometric processes.

FIG. 15 provides a number of such examples. Candidate 1502 may initially be located outside of the far field but may approach the system through the far field and eventually be located within the medium field at the end of the capture period. In an exemplary embodiment, an initial identification may be performed based on far field facial recognition, the recognition may be confirmed and improved based on subsequent far field images and/or averaging, and a further confirmation may be performed based on iris and facial images captured in the medium field. Candidate 1504 may initially be located in the far field and may approach the system through the medium field and near field. In an exemplary embodiment, an initial identification may be performed based on far field facial recognition, the recognition may be confirmed and improved based on subsequent far field images and/or averaging, and a further confirmation may be performed based on iris and facial images captured in the medium field and iris images captured in the near field. Candidate 1506 may initially be located in the far field and may remain in the far field for the duration of image capture.

In an exemplary embodiment, an initial identification may be performed based on far field facial recognition and the recognition may be confirmed and improved based on subsequent far field images and/or averaging. Candidate 1508 may initially be located in the far field and may initially approach the system through the medium field and near field. The candidate 1508 may then move away from the system back into the medium field and far field. In an exemplary embodiment, an initial identification may be performed based on far field facial recognition, the recognition may be confirmed and improved based on subsequent far field images and/or averaging, and a further confirmation may be performed based on iris and facial images captured in the medium field and iris images captured in the near field. Candidate 1510 may initially be located in the medium field and may remain within the medium field for the duration of the capture period. In an exemplary embodiment, an initial identification may be performed based on blended iris and facial recognition in the medium field and the recognition may be confirmed and improved based on subsequent far field images and/or averaging.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for identifying a candidate, comprising:
capturing, by an optical system, a raw image of the candidate;
identifying, by the optical system, iris features and facial features within the raw image;
quantifying, by the optical system, each of the iris features;
quantifying, by the optical system, each of the facial features;
determining, by the optical system, a first weight associated with the iris features;
determining, by the optical system, a second weight associated with the facial features, wherein the first weight and second weight are based on a distance of the candidate from the optical system;
comparing, by the optical system, the quantified iris features with iris enrollment data to determine an iris match probability;
comparing, by the optical system, the quantified facial features with facial enrollment data to determine a facial match probability;
modifying, by the optical system, the iris match probability based on the first weight;
modifying, by the optical system, the facial match probability based on the second weight;
calculating, by the optical system, a combined probability based on the modified iris match probability and the modified facial match probability; and
confirming, by the optical system, an identity of the candidate based on the combined probability.

2. The method of claim 1, wherein the raw image has an amount of spherical aberration (SA) at an imaging wavelength $\lambda_{IM}$ of $0.2\lambda_{IM} \leq SA \leq 0.5\lambda_{IM}$.

3. The method of claim 1, wherein the depth of field for the optical system is increased by 20%-500% as compared to a diffraction limited system.

4. The method of claim 1, wherein the raw image corresponds to a medium field of the optical system.

5. The method of claim 1, further comprising;
capturing, by the optical system, one or more additional raw images of the candidate;
determining, by the optical system, that the one or more additional raw images correspond to a near field of the optical system;
identifying, by the optical system when the one or more additional raw images correspond to the near field, an additional iris feature within each of the one or more raw images;
quantifying, by the optical system when the one or more additional raw images correspond to the near field, the additional iris feature; and
updating, by the optical system, the iris match probability based on the quantified additional iris feature.

6. The method of claim 1, further comprising;
capturing, by the optical system, one or more additional raw images of the candidate;
determining, by the optical system, that the one or more additional raw images correspond to a far field of the optical system;
identifying, by the optical system when the one or more additional raw images correspond to the far field, an additional facial feature within each of the one or more raw images;
quantifying, by the optical system when the one or more additional raw images correspond to the near field, the additional facial feature;
updating, by the optical system, the facial match probability based on the quantified additional facial feature.

7. The method of claim 1, wherein confirming the identity of the candidate based on the comparing comprises:
determining, by the optical system, a third weight for the iris features;
adjusting, by the optical system, the modified iris match probability based on the second weight for the iris features;
determining, by the optical system, a fourth weight for the facial features;
adjusting, by the optical system, the modified facial match probability based on the fourth weight for the facial features;
updating, by the optical system, the combined probability based on the adjusted modified iris match probability and the adjusted modified facial match probability; and
confirming, by the optical system, the identity of the candidate based on the updated combined probability.

8. The method of claim 7, wherein the third weight and the fourth weight are based on a change in distance from the candidate to the optical system.

9. The method of claim 1, further comprising:
determining, by the optical system, that the candidate is located within a medium field for the optical system; and
identifying, by the optical system, the iris features and the facial features within each of the one or more raw images based on the determining.

10. The method of claim 1, further comprising:
determining, by the optical system, a location of the candidate; and
modifying one of an exposure time or an illumination level based on the determined location, wherein the exposure time or the illumination level is increased when the location corresponds to a near field and wherein the exposure time or the illumination level is decreased when the location corresponds to a far field.

11. The method of claim 1, wherein the optical system comprises a single lens.

12. The method of claim 11, wherein the single lens comprises a folded single lens.

13. The method of claim 1, wherein the optical system is configured to acquire facial images for comparison with facial data in a far field, iris images and facial images for comparison with iris data and facial data in a medium field, and iris images for comparison with iris data in a near field.

14. The method of claim 13, wherein iris images are not compared to the iris data in the far field and wherein facial images are not compared to facial data in the near field.

15. The method of claim 13, wherein the far field, medium field, and near field are continuous within a field of view of the optical system.

16. The method of claim 13, wherein the near field is adjacent to the medium field and wherein the far field is adjacent to the medium field.

17. An optical system, comprising:
at least one lens configured to capture a raw image of a candidate; and
a controller coupled to the optical system, wherein the controller is configured to:
identify iris features and facial features within the raw image,
quantify each of the iris features,
quantify each of the facial features,
determine a first weight associated with the iris features,
determine a second weight associated with the facial features, wherein the first weight and second weight are based on a distance of the candidate from the optical system,
compare the quantified iris features with iris enrollment data to determine an iris match probability,
compare the quantified facial features with facial enrollment data to determine a facial match probability,
modifying the iris match probability based on the first weight,
modifying the facial match probability based on the second weight,
calculate a combined probability based on the modified iris match probability and the modified facial match probability, and confirm an identity of the candidate based on the combined probability.

18. The optical system of claim 17, wherein the optical system is configured to acquire facial images for comparison with facial data in a far field, iris images and facial images for comparison with iris data and facial data in a medium field, and iris images for comparison with iris data in a near field.

19. A method for identifying a candidate, comprising:
determining, by an optical system, whether the candidate is located within a near field, a medium field, or a far field;
capturing, by the optical system, one or more raw images of a face of the candidate;
quantifying, by the optical system, only iris features from the one or more raw images when the candidate is located in the near field;
quantifying, by the optical system, the iris features and facial features from the one or more raw images when the candidate is located in the medium field;
quantifying, by the optical system, only the facial features from the one or more raw images when the candidate is located in the far field;
comparing, by the optical system when the candidate is in the near field or the medium field, the quantified iris features with iris enrollment data;
comparing, by the optical system when the candidate is in the medium field or the far field, the quantified facial features with facial enrollment data;
determining, by the optical system, an identity of the candidate based only on the comparing of the iris features when the candidate is in the near field;
determining, by the optical system, the identity of the candidate based on the comparing of the iris features and the comparing of the facial features when the candidate is in the medium field; and
determining, by the optical system, the identity of the candidate based only on the comparing of the facial features when the candidate is in the far field.

20. The method of claim 19, wherein the optical system comprises a single lens.

21. The method of claim 1, wherein the first weight increases based on a decrease in the distance and the second weight increases based on an increase in the distance.

22. The optical system of claim 17, wherein the first weight increases based on a decrease in the distance and the second weight increases based on an increase in the distance.

* * * * *